United States Patent
Leiza et al.

(10) Patent No.: US 12,454,621 B2
(45) Date of Patent: Oct. 28, 2025

(54) METHOD FOR PROVIDING COATING SYSTEMS WITH CORROSION-PROTECTIVE PROPERTIES

(71) Applicants: The University of the Basque Country/Institute, Donostia (ES); Fundación Cidetec, Donostia (ES)

(72) Inventors: José Ramón Leiza, Donostia (ES); Maria Paulis, Donostia (ES); Stefano Chimenti, Donostia (ES); Jesus Manuel Vega, Donostia (ES); Eva García, Donostia (ES)

(73) Assignee: The University of the Basque Country/Institute Fundación Cidetec (ES)

( * ) Notice: Subject to any disclaimer, the term of this patent is extended or adjusted under 35 U.S.C. 154(b) by 0 days.

(21) Appl. No.: 18/743,009

(22) Filed: Jun. 13, 2024

(65) Prior Publication Data
US 2024/0336784 A1    Oct. 10, 2024

Related U.S. Application Data

(63) Continuation of application No. 17/183,943, filed as application No. PCT/EP2019/052860 on Feb. 6, 2019, now abandoned.

(30) Foreign Application Priority Data

Aug. 31, 2018 (EP) ..................... 18000709
Dec. 20, 2018 (EP) ..................... 18214851

(51) Int. Cl.
C09D 5/08 (2006.01)
C08F 2/22 (2006.01)
(Continued)

(52) U.S. Cl.
CPC .............. *C09D 5/08* (2013.01); *C08F 2/22* (2013.01); *C08F 30/02* (2013.01); *C08F 230/02* (2013.01);
(Continued)

(58) Field of Classification Search
CPC ..... C09D 5/08; C08F 2/22; C08F 2/24; C08F 2/26; C08F 2/28; C08F 2/30; C08F 30/02; C08F 230/02
See application file for complete search history.

(56) References Cited

U.S. PATENT DOCUMENTS

| 3,970,725 A * | 7/1976 | Tugukuni | C08F 283/006 |
| | | | 524/904 |
| 2011/0159306 A1* | 6/2011 | Schellekens | C09D 153/00 |
| | | | 524/460 |

(Continued)

FOREIGN PATENT DOCUMENTS

| CN | 104710555 | | 6/2015 |
| CN | 104710555 A | * | 6/2015 |

(Continued)

OTHER PUBLICATIONS

MatWeb, "Solvay Sipomer PAM-200 phosphate esters of Ppg Monmethacrylate", MatWeb, accessed on Mar. 9, 2024 at https://www.matweb.com/search/datasheet.aspx?matguid=42d02eb9c9ab46869678369b414dceal&ckck=1 (Year: 2024).*

*Primary Examiner* — Joseph S Del Sole
*Assistant Examiner* — David L Miller
(74) *Attorney, Agent, or Firm* — Edward E. Sowers; Brannon Sowers & Cracraft PC

(57) ABSTRACT

The present invention is directed to a method for producing a coating system providing corrosion-protective properties when applied to metal surfaces, particularly in the form of a water-based (waterborne) composition, preferably in the form of a dispersion (i.e. emulsion or latex, respectively), as (Continued)

well as to coating system thus produced and to its various applications. The resulting coating system provides superior properties with respect to corrosion protection, on the one hand, and adhesion to metal surfaces, on the other hand, while at the same time being environmentally compatible and easy to use and to apply and being producible in an economic way.

18 Claims, 14 Drawing Sheets

(51) Int. Cl.
*C08F 30/02* (2006.01)
*C08F 230/02* (2006.01)
*C08F 2/38* (2006.01)
*C08F 220/14* (2006.01)
*C08F 293/00* (2006.01)

(52) U.S. Cl.
CPC .............. *C08F 2/38* (2013.01); *C08F 220/14* (2013.01); *C08F 293/005* (2013.01)

(56) References Cited

U.S. PATENT DOCUMENTS

| 2013/0017945 A1* | 1/2013 | Braun | ................... C08F 220/06 502/7 |
| 2013/0052457 A1 | 2/2013 | Inui | |
| 2015/0051334 A1 | 2/2015 | Wu | |
| 2022/0126366 A1* | 4/2022 | Chen | ................... C08F 220/306 |

FOREIGN PATENT DOCUMENTS

WO       2017095881       6/2017
WO     WO-2017206162 A1 * 12/2017    ............ C08F 212/08

* cited by examiner

METHOD FOR PROVIDING COATING SYSTEMS WITH CORROSION-PROTECTIVE PROPERTIES

CROSS-REFERENCES TO RELATED APPLICATIONS

This patent application is a continuation of U.S. application Ser. No. 17/183,943, entitled "A METHOD FOR PROVIDING COATING SYSTEMS WITH CORROSION-PROTECTIVE PROPERTIES" filed on Feb. 24, 2021, claiming priority to PCT/EP 2019/052860 filed Feb. 6, 2019, EP 18 000 709.8 filed Aug. 31, 2018, and EP 18 214 851.0 filed Dec. 20, 2018, and incorporates all by reference herein, as if each were independently incorporated in its entirety.

BACKGROUND OF THE INVENTION

The present invention refers to the technical field of corrosion engineering, especially corrosion protection (i.e. corrosion prevention).

Especially, the present invention relates to a method for producing a coating system providing corrosion-protective properties when applied to metal surfaces (e.g. surfaces of e.g. iron or iron-containing alloys, such as e.g. steel, or aluminum and aluminum-containing alloys or magnesium and magnesium-containing alloys), particularly in the form of a water-based (waterborne) composition, preferably in the form a dispersion (emulsion), as well as to a coating system obtainable by this method and to the uses and applications of such coating system.

Furthermore, the present invention is also directed to paints, lacquers, varnishes, colors, impregnations, glazes, enamels and finishes with corrosion-protective properties, comprising the inventive coating system.

Moreover, the present invention also refers to a method for providing corrosion-protective properties to metal surfaces (e.g. surfaces of e.g. iron or iron-containing alloys, such as e.g. steel, or aluminum and aluminum-containing alloys or magnesium and magnesium-containing alloys) by applying the inventive coating system.

Finally, the present invention is also directed to a metal surface of an article, which metal surface has been provided with corrosion-protective properties (e.g. surfaces of e.g. iron or iron-containing alloys, such as e.g. steel, or aluminum and aluminum-containing alloys or magnesium and magnesium-containing alloys).

The phenomenon of corrosion is an omnipresent and pervasive problem occurring in all technical fields where metallic surfaces are used. Therefore, there is a high demand in the prior art to prevent or at least to reduce the risk of corrosion; consequently, many efforts have been made so far to overcome this problem, however, without finding a satisfying solution until now.

The term corrosion denotes a natural process which converts refined metals (e.g. iron or iron-containing alloys, such as e.g. steel, and aluminum and aluminum-containing alloys and magnesium and magnesium-containing alloys) to a more chemically-stable form, such as their oxides, hydroxides, sulfides etc. Particularly, corrosion is the gradual destruction of materials (usually metals, such as iron and iron alloys, e.g. steel, and aluminum and aluminum-containing alloys and magnesium and magnesium-containing alloys) by chemical and/or electrochemical reaction with their environment. In the most common use of this term, corrosion means electrochemical oxidation of metals in reaction with an oxidant such as e.g. oxygen, sulfates etc.

Rusting (i.e. the formation of iron oxides or other metal oxides) is a well-known and typical example of electrochemical corrosion. This type of damage typically produces oxides, sulfates or other salts etc. of the original metal and results in a distinctive orange coloration in the case of iron and iron alloys. Many structural alloys corrode merely from exposure to moisture in the air, but the process of corrosion can be strongly affected by exposure to certain corroding or oxidative substances. Corrosion may be concentrated locally, especially to form pits or cracks, or it may extend across a wide area more or less uniformly, i.e. corroding the whole surface. Since corrosion is a diffusion-controlled process, it occurs on exposed surfaces.

Corrosion engineering is the technical field which is dedicated to preventing, controlling and/or stopping corrosion.

According to an estimate of NACE International (National Association of Corrosion Engineers, i.e. a not-for-profit professional organization for the corrosion control industry), the yearly global economic damage resulting from corrosion is to be in the amount of 2.5 trillions of US dollars.

Therefore, since corrosion is a diffusion-controlled process taking place on exposed metal surfaces (as delineated before), various methods have been attempted and applied to reduce the activity of such exposed metal surfaces in order to increase corrosion resistance or to reduce the corrosion risk, respectively. Such methods comprise, inter alia, electrochemical or electrolytic conversion or passivation processes (e.g. anodizing), galvanization, plating and electroplating, zinc and/or aluminum flake coating, passivation, phosphate conversion coating, corrosion inhibition coating etc.

However, many of these methods are either non-compatible with most recent environmental requirements or not economic or very complex in their application or even inefficient in their desired effects.

Particularly, corrosion control has been developed by applying coatings, particularly organic coatings, with very good results. Although economics and aesthetics in organic coating are important features in the selection of an anticorrosive protection system, corrosion protection of metallic substrates or articles is one of the key roles of organic coatings. Nowadays, organic solvents are used during the synthesis and final application of most of the protective organic coatings. However, environmental standards establish that volatile organic compounds (VOCs) must be controlled and maintained at low levels.

The current practice for applying state-of-the-art (i.e. conventional) organic coatings to metal substrates comprises a complex multi-step process: Usually, the metal surface is first cleaned, then phosphated or chromated, subsequently optionally sealed (e.g. with hot water or carcinogenic chromates), then dried and finally painted. Such complex pretreatment process is error-prone and costly; however, it is nevertheless necessary in the metal finishing industry, especially for copper-containing alloys of aluminum. These alloys are typically passivated with a chromate conversion coating prior to painting. Toxic chemicals and metals, such as VOCs and chromium, are commonly used in the application of conversion coatings to various metal surfaces. Consequently, such multi-step coating technologies also produce highly polluted wastes comprising organic solvents, heavy metals and other toxic deleterious materials. Therefore, the demand for the elimination of toxic deleterious materials, such as e.g. hexavalent chromium, and an improved durability of paint requires novel surface-treatment techniques.

The environmental impact of volatile organic compounds and of other toxic deleterious materials has stimulated the substitution of solvent-borne (i.e. solvent-based) organic coatings by waterborne (i.e. water-based) coatings; the latter may mostly be obtained from aqueous dispersions (i.e. lattices) of polymeric particles.

Consequently, there is a high demand for high-performance waterborne (i.e. water-based) anticorrosion coatings in the coatings industry, especially with the aim to provide comparable properties as in the case of solvent-borne (i.e. solvent-based) organic coating system. Among the waterborne (water-based) coatings, particularly acrylate latex coatings play an important role due to their extraordinary properties including high adornment properties, good film formation and environmental compatibility.

However, the shortcomings of waterborne (water-based) anticorrosion coatings, such as particularly poor resistance to water, weak adhesion as well as poor corrosion resistance, limit their application so far.

For, adhesion is one of the most important properties in coatings for metal protection, especially in the case of waterborne (i.e. water-based) systems because any loss of adhesion allows water to enter the coating/substrate-interface where it acts twofold in a deleterious manner: first, expanding the detached area and hence producing blistering, and, secondly, initiating corrosion. Consequently, both dry and wet adhesion (needed when water penetrates the coating film) is required to accurately prevent corrosion on metal surfaces. For, the hydrogen bridges between the metal substrate and the coating, which are responsible for adhesion of the coating, may be weakened by the action of the incoming water so that adhesion may get lost. This phenomenon finally permits water to attack the metal surface and to initiate corrosion. As corrosion proceeds, ferrous and hydroxide ions are formed, thus generating an osmotic cell under the coating film (wherein osmotic pressure can be expected to range between 2,500 and 3,000 kPa whereas the resistance of organic coatings to deformational forces is lower, namely typically ranging from 6 to 40 kPa). Thus, blisters are formed and expand, thus exposing more unprotected metal surface.

Wet adhesion may be substantially improved by pretreating the metal with conversion coatings, such as e.g. phosphate and/or chromate conversion coatings. However, this is a very complex procedure and, above all, not an environmentally friendly process due to the use of hexavalent chromium.

Thus, so-called in situ phosphatizing systems have been developed wherein an in situ phosphatizing agent (ISPR) is premixed with the coating (cf. C. Lin, *Prog. Org. Coat.* 42 (2001) 226); the use of this ISPR is to avoid the use of emerging baths and thus the generation of high amounts of waste water. However, the use of these systems requires the mixing of two different components, and hence an additional application step which is error-prone is required. Furthermore, such systems are often not very efficient or of poor performance.

BRIEF SUMMARY OF THE INVENTION

Therefore, it is an object of the present invention, to provide a method for producing a coating system for providing corrosion-protective properties to metal surfaces, particularly in the form of a waterborne (i.e. water-based) composition or dispersion, wherein the aforementioned disadvantages and/or drawbacks of the prior art coating systems should be at least partially avoided or even at least essentially overcome.

Particularly, it is another object of the present invention to provide a method for producing a coating system for providing corrosion-protective properties to metal surfaces, particularly in the form of a waterborne (i.e. water-based) composition or dispersion, which coating system shall be able to provide an efficient corrosion protection to metal surfaces when applied while at the same time having a high affinity to the metal surfaces to be treated, especially with the aim to ensure a good adhesion to the metal surfaces to be treated, preferably both good dry and wet adhesion properties.

Furthermore, it is another object of the present invention to provide a method for producing a coating system for providing corrosion-protective properties to metal surfaces, particularly in the form of a waterborne (i.e. water-based) composition or dispersion, which coating system shall be compatible to environmental requirements and constraints, especially avoiding the use of deleterious and/or toxic ingredients or materials (such as e.g. volatile organic compounds, heavy metals etc.) and not leading to highly polluted wastes.

Furthermore, it is another object of the present invention to provide a method for producing a coating system for providing corrosion-protective properties to metal surfaces, particularly in the form of a waterborne (i.e. water-based) composition or dispersion, which coating system shall be economic and cost-efficient in its production and shall be easy to use and to apply.

Especially, it is yet another object of the present invention to provide and/or develop a novel coating system for providing corrosion-protective properties to metal surfaces, particularly in the form of a waterborne (i.e. water-based) composition or dispersion, which is especially appropriate for anticorrosive applications on metal surfaces and shows improved properties, especially improved corrosion-protective properties and, at the same time, improved adhesion properties while simultaneously being environmentally compatible, economic and cost-efficient in its production as well as easy to use and to apply.

To achieve the aforementioned objects, the present invention proposes, according to a first aspect of the present invention, a method for producing a coating system providing corrosion-protective properties when applied to metal surfaces as disclosed herein; further and especially advantageous embodiments of the inventive method are the subject-matter of the method claims.

According to a second aspect of the present invention, the present invention further provides a coating system; further and especially advantageous embodiments of the inventive coating system are the subject-matter of certain claims.

Furthermore, the present invention—according to a third aspect of the present invention—also relates to the use of inventive coating system.

Moreover, according to a fourth aspect of the present invention, the present invention is also directed to paints, lacquers, varnishes, colors, impregnations, glazes, enamels and finishes with corrosion-protective properties, comprising an inventive coating system.

Also, according to a fifth aspect of the present invention, the present invention further relates to a method for providing corrosion-protective properties to metal surfaces.

Finally, according to a sixth aspect of the present invention, the present invention further provides a metal surface of an article, which metal surface is provided with corrosion-protective properties.

It will be understood that features, embodiments, advantages and the like which are recited herein in relation to one aspect of the invention, of course, also apply correspondingly in relation to all other aspects of the invention.

Moreover, it is pointed out that the respective values and/or parameter indications can be determined in general on the basis of determination methods which are well-known to the skilled practitioner and/or which are explicitly indicated in the following.

Furthermore, it will also be well understood that a person skilled in the art may, for a particular application or on an one-off basis, depart from any hereinbelow recited numbers, values and ranges, without thereby leaving the scope of the present invention.

Surprisingly, as applicant has unexpectedly found out, the above-described problems and the disadvantages of the prior art can be overcome and the above-defined objects can be achieved by chemically incorporating phosphate active groups into a very specific polymeric network under defined polymerization conditions.

DETAILED DESCRIPTION OF THE INVENTION

Figure 1:
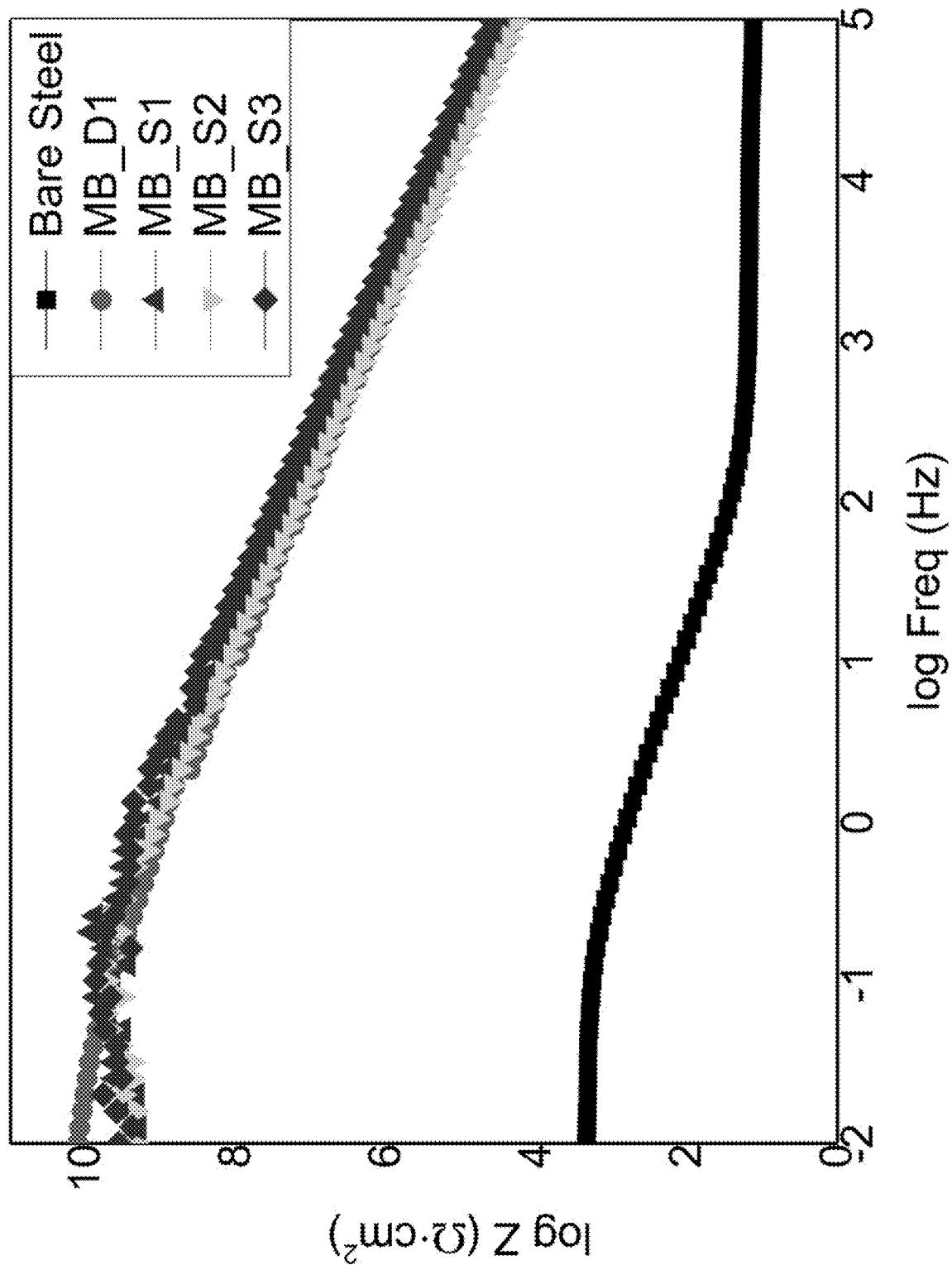
FIG. 1 provides an Impedance diagram for coated samples and bare steel for all systems independently of the drying conditions and chemical composition of the surfactant.

Thus, the present invention—in accordance with a first aspect of the present invention—refers to a method for producing a coating system providing corrosion-protective properties when applied to metal surfaces, particularly in the form of a water-based (waterborne) composition, preferably dispersion (emulsion), wherein the method comprises producing, via emulsion polymerization in a two-stage radical polymerization process, a copolymer comprising moieties (i), (ii), (iii) and optionally (iv) according to the following definition and each being different from one another:
   (i) a first ethylenically unsaturated monomer, the homopolymer of which has a glass transition temperature $Tg^{(i)}$ ranging from 30° C. to 200° C., especially from 40° C. to 150° C.,
   (ii) a second ethylenically unsaturated monomer, the homopolymer of which has a glass transition temperature $Tg^{(ii)}$ ranging from −100° C. to −10° C., especially from −60° C. to −20° C.,
   (iii) a phosphate-group containing methacrylic monomer (PAM), wherein the phosphate-group containing methacrylic monomer (PAM) is selected from phosphates and phosphate esters of polyalkylene glycol monomethacrylates, and
   (iv) an optional further monomer selected from (1) perfluoroalkyl (meth)acrylates (PFA),
      (2) $C_{12}$-$C_{22}$-alkyl(meth)acrylates, especially $C_{12}$-$C_{22}$-alkyl(meth)acrylates forming semicrystalline homopolymers, preferably stearyl(meth)acrylates (SMA), and
      (3) mesogenic monomers comprising ethylenically unsaturated monomeric moieties, especially mesogenic monomers comprising (meth)acrylate monomeric units comprising side-chains and/or ester groups bearing mesogenic functionalities, especially biphenyl mesogen groups;
   wherein:
   (a) in a first stage (step), an emulsion prepolymerization of at least part of at least one of monomers (i), (ii) and/or optionally (iv) is performed in the absence of monomer (iii), so as to produce an emulsion prepolymerization product to be used as a seed in the subsequent second stage (step) (b); and then
   (b) in a second stage (step), the emulsion prepolymerization product resulting from stage (a) and the remainder of monomers (i), (ii) and optionally (iv), if any, are commonly polymerized together with and in the presence of monomer (iii), so as to yield a composition, preferably a dispersion (emulsion), which contains a copolymer comprising moieties of (i), (ii), (iii) and optionally (iv).

The inventive method as well as the inventive coating system thus produced and the uses and applications thereof are linked to a multitude of particularities and advantages, which significantly distinguish the present invention over the prior art and which indicate the significant technical progress involved by the present invention if compared to the prior art.

The inventive method is conceived as a two-stage (two-step) process: In a first stage (step) (a), a pre-polymerization product is produced via emulsion polymerization, so that the resulting product from the first stage (step) (a) can be used as a seed in a subsequent second stage (step) (b); the subsequent second stage (step) (b) is thus performed as a so-called seeded polymerization, particularly as a seeded emulsion polymerization.

Typically, the overall method, i.e. both the first stage (step) (a) and also the second stage (step) (b), is/are performed as an emulsion polymerization, particularly as a radical emulsion polymerization.

The method of the present invention as well as the resulting coating system are environmentally friendly and environmentally compatible under several aspects and particularly fulfill also the most recent environmental requirements: The overall method, i.e. both the first stage (step) (a) and the second stage (step) (b), is performed in a liquid water-based (i.e. water-borne) carrier or milieu. Thus, the use of organic solvents and of volatile organic compounds (VOCs) (of course, except for the used monomers) may be efficiently avoided completely. Therefore, also the resulting inventive coating system, particularly in the form of a water-based (water-borne) composition, preferably as a dispersion (i.e. emulsion or latex), is conceived on a mere water-borne (water-based) basis or formulation, so that also on behalf of its use or application no volatile organic substances have to be handled. Consequently, both the inventive method and the resulting coating system of the present invention are highly environmentally friendly and thus fulfill also the most recent requirements as to environmental compatibility.

Since the overall method of the present invention is performed in a water-based (water-borne) carrier system or milieu, waste waters or wastes polluted with organics are completely avoided. This facilitates performing and handling of the inventive method and the resulting coating system and contributes to the highly environmental compatibility of the present invention. Thus, the invention is also applicable on an industrial level or on a large-scale level, respectively.

Above all, a high-performance coating system is provided by the present invention, which again provides corrosion-protective properties when applied to metal surfaces: On the one hand, the inventive coating system provides excellent corrosion protection or corrosion prevention to metal surfaces treated therewith; on the other hand, the inventive coating system provides an excellent adhesion with respect to the metal surfaces treated therewith, namely both under dry and wet conditions (i.e. excellent dry adhesion and excellent wet adhesion of the inventive coating system). These properties, inter alia, significantly distinguish the present coating system from prior art systems, i.e. the inventive coating system unifies, at the same time, excellent corrosion-protective properties, on the one hand, and superior adhesion properties with respect to the metal surfaces to be treated, on the other hand.

Due to the presence of functional active or reactive groups, especially phosphate or phosphate ester groups, in the copolymers comprised by the inventive coating system, a double functionality and thus a double protection of the metal surfaces to be treated can be reached: On the one hand, the presence of the functional active or reactive phosphate or phosphate ester groups can effect significant and efficient phosphatization of the metal surface to be treated and, at the same time, effect a bonding via chemical groups or bonds (i.e. via the phosphate groups). On the other hand, the inventive coating system possesses excellent film-forming properties, so that—in addition to the chemical phosphatization effected by the phosphate or phosphate ester groups—a supplementary physical barrier is created by the inventive coating system on the treated metal surfaces, which additionally protects the metal surfaces treated therewith against corrosion. Due to the hydrophobic (but also oleophobic) character of the copolymers comprised by the inventive coating system, the contact with water is efficiently avoided and also oxygen cannot penetrate the coating film and can thus not contact the metal surfaces. Consequently, on the whole, the inventive coating system provides a double corrosion protection, namely by chemical phosphatization, on the one hand, and by physical film-forming barrier properties, on the other hand.

The resulting coating system providing corrosion-protective properties comprises a copolymer comprising, inter alia, moieties (i) and (ii) having different characteristics, namely moiety (i) based on/derived from a first ethylenically unsaturated monomer, the homopolymer of which has a glass transition temperature $Tg^{(i)}$ ranging from 30° C. to 200° C., especially from 40° C. to 150° C., on the one hand, and moiety (ii) based on/derived from a second ethylenically unsaturated monomer, the homopolymer of which has a glass transition temperature $Tg^{(ii)}$ ranging from –100° C. to –10° C., especially from –60° C. to –20° C. (i.e. the second ethylenically unsaturated monomer being different from the first ethylenically unsaturated monomer). Consequently, moiety (i), due to the relatively high glass transition temperature $Tg^{(i)}$, forms a rigid or stiff part (moiety) in the overall copolymer of the coating system, whereas moiety (ii), due to the relatively low glass transition temperature $Tg^{(ii)}$, forms a soft or flexible part (moiety) in the overall copolymer of the coating system.

The resulting copolymer is thus a "hybrid" copolymer comprising both a moiety (i) having rigid or stiff characteristics and also another moiety (ii) having soft or flexible characteristics. On behalf of application of the coating system comprising such copolymer, moiety (i) having rigid or stiff characteristics provides barrier properties as well as improved mechanical properties (such as e.g. scratch or scrub resistance etc.) and thus an improved anticorrosion barrier to the resulting coating whereas moiety (ii) having soft or flexible characteristics provides, to the resulting coating, improved flexibility (e.g. reduced brittleness and thus reduced tendency of cracking) and extended durability (e.g. longevity) as well as improved film-forming properties and adhesion.

As delineated already hereinabove, moiety (iii) comprising the phosphate or phosphate ester groups effects significant and efficient phosphatization of the metal surface to be treated and, at the same time, a bonding via chemical groups or bonds (i.e. via the phosphate groups).

By the presence and incorporation of optional further monomers (iv) as defined hereinbefore, the performance of the inventive coating system can be modified or tailored and even improved: On behalf of the inventive production method, via emulsion polymerization, especially via miniemulsion polymerization, these optional monomers (iv) may be efficiently integrated into the copolymeric network and can thus contribute to the specific properties of the resulting copolymer comprised by the inventive coating system.

In this respect, specifically the presence and interpolymerization of perfluoroalkyl (meth)acrylates (PFA), especially perfluorooctyl acrylate (POA), increases the hydrophobic (but also oleophobic) properties of the resulting copolymer and thus increases the hydrophobic (but also oleophobic) barrier properties of the whole inventive coating system; this further increases the reduction of the permeation water permeating through the resulting coating.

In this respect, specifically the presence and interpolymerization of stearyl(meth)acrylates (SMA), particularly stearyl acrylate, leads to crystalline, especially nanocrystalline domains in the resulting copolymeric networks; these crystalline, especially nanocrystalline domains inside the copolymeric matrix result in the formation of semi-crystalline copolymers having a core/shell-structure, wherein the presence of these crystalline domains significantly reduces the permeation and the adsorption of water and oxygen through the resulting coating, thus also increasing the anticorrosive properties of the resulting coating.

In this respect, specifically the presence and interpolymerization of $C_{12}$-$C_{22}$-alkyl(meth)acrylates, especially $C_{12}$-$C_{22}$-alkyl(meth)acrylates forming semicrystalline homopolymers, preferably stearyl(meth)acrylates (SMA), or the presence and interpolymerization of mesogenic monomers comprising ethylenically unsaturated monomeric moieties, especially mesogenic monomers comprising (meth)acrylate monomeric units comprising side-chains and/or ester groups bearing mesogenic functionalities, especially biphenyl mesogen groups, leads to rigid or stiff moieties, especially those having semicrystalline or crystalline characteristics. This again improves mechanical and barrier properties of the resulting coating.

Thus, by the presence and incorporation/interpolymerization of the optional monomers (iv), the performance of the resulting coating system of the present invention can be efficiently controlled and tailored. This is also a significant particularity and advantage of the inventive method and of the respective coating system resulting therefrom.

As delineated before, the coating systems of the present invention resulting from the inventive production method provide excellent film-forming properties, so that a dense coating film is formed on the metal surfaces to be treated, so that an efficient corrosion protection is provided by the inventive coating system, fulfilling at the same time the requirements of an excellent corrosion protection, an efficient adhesion to the metal surfaces to be treated and an environmental compatibility. Especially, the use of toxic or harmful substances, such as organics (e.g. volatile organic compounds or VOCs) or heavy metals (e.g. chromium etc.), may be completely avoided by the present invention. At the same time, the resulting coating provides excellent mechanical and barrier properties.

Apart from this, the inventive method is economically efficient and especially uses commercially available and usual starting materials and may be easily controlled and performed also on an industrial or large-scale production level. The inventive method, i.e. the production process, is both economic and cost-efficient and also environmentally compatible as well as easy to use and to apply.

On the whole, the present invention provides an efficient method for producing coating systems providing corrosion-protective properties when applied to metal surfaces and also provides high-performance coating systems providing corrosion-protective properties to metal surfaces treated therewith.

As clearly delineated hereinbefore, the present invention, namely both the inventive process as well as the coating system resulting therefrom and the uses and applications thereof, is linked to a multitude of particularities and advantages, which clearly distinguish the present invention from the disadvantageous prior art techniques.

In the following, the present invention, first of all the inventive method, will be explained in more detail.

With respect to moiety (i), as delineated hereinabove, moiety (i) of the copolymer of the coating system produced by the inventive method is based on or derived from a first ethylenically unsaturated monomer, the homopolymer of which has a glass transition temperature $Tg^{(i)}$ ranging from 30° C. to 200° C., especially from 40° C. to 150° C. (i.e. a first ethylenically unsaturated monomer forming a homopolymer having a glass transition temperature $Tg^{(i)}$ ranging from 30° C. to 200° C., especially from 40° C. to 150° C.) (i.e. glass transition temperature $Tg^{(i)}$ in accordance with standard DIN EN ISO 11357-2: 2014).

The glass-liquid transition or glass transition, according to IUPAC (International Union of Pure and Applied Chemistry) definition, is the process in which a polymer melt changes on cooling to a polymer glass or a polymer glass changes on heating to a polymer melt. Especially, the glass-liquid transition or glass transition denotes the gradual and reversible transition in amorphous polymers or in amorphous regions/moieties of semicrystalline polymers from a hard and relatively brittle, i.e. glassy or glass-like state into a viscous or rubbery state as the temperature is increased. In this respect, the so-called glass transition temperature Tg of a polymer characterizes the temperature where this glass transition occurs.

The glass transition temperature Tg indicated herein particularly refers to the glass transition temperature Tg as defined and/or determined according to standard DIN EN ISO 11357-2: 2014 (determination via Differential Scanning Calorimetry DSC).

According to a particular embodiment of the inventive method, it is preferred when moiety (i) and/or (i) the first ethylenically unsaturated monomer, the homopolymer of which has a glass transition temperature $Tg^{(i)}$ ranging from 30° C. to 200° C., especially from 40° C. to 150° C., is selected from the group consisting of:
  (1) linear, branched or cycloaliphatic $C_1$-$C_{22}$-alkyl(meth)acrylates, especially methyl(meth)acrylate, ethyl(meth)acrylate, n-butyl(meth)acrylate, isobutyl(meth)acrylate, lauryl(meth)acrylate, 2-ethylhexyl(meth)acrylate, stearyl(meth)acrylate, cyclohexyl(meth)-acrylate, isobornyl(meth)acrylate and tert-butyl(meth)acrylate;
  (2) aryl(meth)acrylates, especially benzyl(meth)acrylate and phenylacrylate, especially wherein the aryl radicals may be each unsubstituted or substituted with up to four substituents;
  (3) mono(meth)acrylates of ethers, polyethyleneglycols, polypropyleneglycols or mixed polyethylene/propylene glycols each comprising 5 to 80 carbon atoms, especially tetrahydrofurfuryl(meth)acrylate, methoxyethoxyethyl(meth)acrylate, 1-butoxypropyl(meth)acrylate, cyclohexyloxymethyl(meth)acrylate, methoxymethoxy-ethyl(meth)acrylate, benzyloxymethyl(meth)acrylate, furfuryl(meth)acrylate, 2-butoxy-ethyl(meth)acrylate, 2-ethoxyethyl(meth)acrylate, allyloxymethyl(meth)acrylate, 1-ethoxybutyl(meth)acrylate, 1-ethoxyethyl(meth)acrylate, ethoxymethyl(meth)acrylate, poly(ethyleneglycol)methylether(meth)acrylate and poly(propyleneglycol)methylether-(meth)acrylate;
  (4) aminoalkyl(meth)acrylates, especially N,N-dimethylaminoethyl(meth)acrylate, 2-trimethylammoniumethyl(meth)acrylatchloride and N,N-dimethylaminopropyl-(meth)acrylate;
  (5) oxiranyl(meth)acrylates, especially 2,3-epoxybutyl(meth)acrylate, 3,4-epoxybutyl-(meth)acrylate and glycidyl(meth)acrylate;
  (6) styrenes and substituted styrenes, especially α-methylstyrenes, 4-methylstyrenes, 4-vinylbenzoic acid and sodium-4-vinylbenzene sulfonate;

(7) (meth)acrylonitrile;

(8) ethylenically unsaturated sulfonic acids and sulfates and salts thereof, especially potassium[3-((meth)acryloyloxy)propyl]sulfonate and ammonium[2-((meth)acryloyloxy)-ethyl]sulfate;

(9) vinylesters of carboxylic acids comprising 1 to 20 carbon atoms, especially vinylacetate;

(10) vinylesters of versatic acids;

(11) (meth)acrylamide;

(12) N-alkyl- and N,N-dialkyl-substituted (meth)acrylamides comprising linear, branched or cycloaliphatic $C_1$-$C_{22}$-alkyl groups, especially N-(tert-butyl)acrylamide and N,N-dimethyl-acrylamide.

According to yet another particular embodiment of the inventive method, it is preferred when moiety (i) and/or (i) the first ethylenically unsaturated monomer, the homopolymer of which has a glass transition temperature $Tg^{(i)}$ ranging from 30° C. to 200° C., especially from 40° C. to 150° C., is selected from the group consisting of:

(1) linear, branched or cycloaliphatic $C_1$-$C_{22}$-alkylmethacrylates, especially methylmethacrylate, ethylmethacrylate, n-butylmethacrylate, iso-butylmethacrylate, laurylmethacrylate, 2-ethylhexylmethacrylate, stearylmethacrylate, cyclohexylmethacrylate, isobornylmethacrylate and tert-butylmethacrylate;

(2) arylmethacrylates, especially benzylmethacrylate and phenylacrylate, especially wherein the aryl radicals are each unsubstituted or substituted with up to four substituents;

(3) monomethacrylates of ethers, polyethyleneglycols, polypropyleneglycols or mixed polyethylene/propylene glycols each comprising 5 to 80 carbon atoms, especially tetrahydrofurfurylmethacrylate, methoxyethoxyethylmethacrylate, 1-butoxypropylmethacrylate, cyclohexyloxymethylmethacrylate, methoxymethoxyethylmethacrylate, benzyloxymethylmethacrylate, furfurylmethacrylate, 2-butoxyethyl-methacrylate, 2-ethoxyethylmethacrylate, allyloxymethylmethacrylate, 1-ethoxybutylmethacrylate, 1-ethoxyethylmethacrylate, ethoxymethylmethacrylate, poly-(ethyleneglycol)methylethermethacrylate and poly(propyleneglycol)methylethermethacrylate;

(4) aminoalkylmethacrylates, especially N,N-dimethylaminoethylmethacrylate, 2-trimethylammoniumethylmethacrylatchloride and N,N-dimethylaminopropyl-methacrylate;

(5) oxiranylmethacrylates, especially 2,3-epoxybutylmethacrylate, 3,4-epoxybutylmethacrylate and glycidylmethacrylate;

(6) styrenes and substituted styrenes, especially α-methylstyrenes, 4-methylstyrenes, 4-vinylbenzoic acid and sodium-4-vinylbenzene sulfonate;

(7) methacrylonitrile;

(8) ethylenically unsaturated sulfonic acids and sulfates and salts thereof, especially potassium[3-(methacryloyloxy)propyl]sulfonate and ammonium[2-(methacryloyloxy)-ethyl]sulfate;

(9) vinylesters of carboxylic acids comprising 1 to 20 carbon atoms, especially vinylacetate;

(10) vinylesters of versatic acids;

(11) methacrylamide;

(12) N-alkyl- and N,N-dialkyl-substituted methacrylamides comprising linear, branched or cycloaliphatic $C_1$-$C_{22}$-alkyl groups, especially N-(tert-butyl)acrylamide and N,N-dimethyl-acrylamide.

According to yet a further particular embodiment of the inventive method, it is preferred when moiety (i) and/or (i) the first ethylenically unsaturated monomer, the homopolymer of which has a glass transition temperature $Tg^{(i)}$ ranging from 30° C. to 200° C., especially from 40° C. to 150° C., is methyl methacrylate (MMA).

With respect to moiety (ii), as delineated hereinabove, moiety (ii) of the copolymer of the coating system produced by the inventive method is based on or derived from a second ethylenically unsaturated monomer, the homopolymer of which has a glass transition temperature $Tg^{(ii)}$ ranging from −100° C. to −10° C., especially from −60° C. to −20° C. (i.e. a second ethylenically unsaturated monomer forming a homopolymer having a glass transition temperature $Tg^{(ii)}$ ranging from −100° C. to −10° C., especially from −60° C. to −20° C.) (i.e. glass transition temperature $Tg^{(ii)}$ in accordance with standard DIN EN ISO 11357-2: 2014).

According to a particular embodiment of the inventive method, it is preferred when moiety (ii) and/or (ii) the second ethylenically unsaturated monomer, the homopolymer of which has a glass transition temperature $Tg^{(ii)}$ ranging from −100° C. to −10° C., especially from −60° C. to −20° C., is selected from the group consisting of:

(1) linear, branched or cycloaliphatic $C_1$-$C_{22}$-alkyl(meth)acrylates, especially methyl(meth)acrylate, ethyl(meth)acrylate, n-butyl(meth)acrylate, isobutyl(meth)acrylate, lauryl(meth)acrylate, 2-ethylhexyl(meth)acrylate, stearyl(meth)acrylate, cyclohexyl(meth)-acrylate, isobornyl(meth)acrylate and tert-butyl(meth)acrylate;

(2) aryl(meth)acrylates, especially benzyl(meth)acrylate and phenylacrylate, especially wherein the aryl radicals are each unsubstituted or substituted with up to four substituents;

(3) mono(meth)acrylates of ethers, polyethyleneglycols, polypropyleneglycols or mixed polyethylene/propylene glycols each comprising 5 to 80 carbon atoms, especially tetrahydrofurfuryl(meth)acrylate, methoxyethoxyethyl(meth)acrylate, 1-butoxypropyl(meth)acrylate, cyclohexyloxymethyl(meth)acrylate, methoxymethoxy-ethyl(meth)acrylate, benzyloxymethyl(meth)acrylate, furfuryl(meth)acrylate, 2-butoxyethyl(meth)acrylate, 2-ethoxyethyl(meth)acrylate, allyloxymethyl(meth)acrylate, 1-ethoxybutyl(meth)acrylate, 1-ethoxyethyl(meth)acrylate, ethoxymethyl(meth)acrylate, poly(ethyleneglycol)methylether(meth)acrylate and poly(propyleneglycol)methylether-(meth)acrylate;

(4) aminoalkyl(meth)acrylates, especially N,N-dimethylaminoethyl(meth)acrylate, 2-trimethylammoniumethyl(meth)acrylatchloride and N,N-dimethylaminopropyl-(meth)acrylate;

(5) oxiranyl(meth)acrylates, especially 2,3-epoxybutyl(meth)acrylate, 3,4-epoxybutyl-(meth)acrylate and glycidyl(meth)acrylate;

(6) styrenes and substituted styrenes, especially α-methylstyrenes, 4-methylstyrenes, 4-vinylbenzoic acid and sodium-4-vinylbenzene sulfonate;

(7) (meth)acrylonitrile;

(8) ethylenically unsaturated sulfonic acids and sulfates and salts thereof, especially potassium[3-((meth)acryloyloxy)propyl]sulfonate and ammonium[2-((meth)acryloyloxy)-ethyl]sulfate;

(9) vinylesters of carboxylic acids comprising 1 to 20 carbon atoms, especially vinylacetate;

(10) vinylesters of versatic acids;

(11) (meth)acrylamide;

(12) N-alkyl- and N,N-dialkyl-substituted (meth)acrylamides comprising linear, branched or cycloaliphatic C$_1$-C$_{22}$-alkyl groups, especially N-(tert-butyl)acrylamide and N,N-dimethyl-acrylamide.

According to yet another particular embodiment of the inventive method, it is preferred when moiety (ii) and/or (ii) the second ethylenically unsaturated monomer, the homopolymer of which has a glass transition temperature Tg$^{(ii)}$ ranging from −100° C. to −10° C., especially from −60° C. to −20° C., is selected from the group consisting of:

(1) linear, branched or cycloaliphatic C$_1$-C$_{22}$-alkylacrylates, especially methylacrylate, ethylacrylate, n-butylacrylate, iso-butylacrylate, laurylacrylate, 2-ethylhexylacrylate, stearylacrylate, cyclohexylacrylate, isobornylacrylate and tert-butylacrylate;

(2) arylacrylates, especially benzylacrylate and phenylacrylate, especially wherein the aryl radicals are each unsubstituted or substituted with up to four substituents;

(3) monoacrylates of ethers, polyethyleneglycols, polypropyleneglycols or mixed polyethylene/propylene glycols each comprising 5 to 80 carbon atoms, especially tetrahydrofurfurylacrylate, methoxyethoxyethylacrylate, 1-butoxypropylacrylate, cyclohexyloxymethylacrylate, methoxymethoxyethylacrylate, benzyloxymethylacrylate, furfurylacrylate, 2-butoxyethylacrylate, 2-ethoxyethylacrylate, allyloxymethylacrylate, 1-ethoxybutylacrylate, 1-ethoxyethylacrylate, ethoxymethylacrylate, poly(ethyleneglycol)-methyletheracrylate and poly(propyleneglycol)methyletheracrylate;

(4) aminoalkylacrylates, especially N,N-dimethylaminoethylacrylate, 2-trimethylammonium-ethylacrylatchloride and N,N-dimethylaminopropylacrylate;

(5) oxiranylacrylates, especially 2,3-epoxybutylacrylate, 3,4-epoxybutylacrylate and glycidyl-acrylate;

(6) styrenes and substituted styrenes, especially α-methylstyrenes, 4-methylstyrenes, 4-vinylbenzoic acid and sodium-4-vinylbenzene sulfonate;

(7) acrylonitrile;

(8) ethylenically unsaturated sulfonic acids and sulfates and salts thereof, especially potassium[3-(acryloyloxy)propyl]sulfonate and ammonium[2-(acryloyloxy)ethyl] sulfate;

(9) vinylesters of carboxylic acids comprising 1 to 20 carbon atoms, especially vinylacetate;

(10) vinylesters of versatic acids;

(11) acrylamide;

(12) N-alkyl- and N,N-dialkyl-substituted acrylamides comprising linear, branched or cycloaliphatic C$_1$-C$_{22}$-alkyl groups, especially N-(tert-butyl)acrylamide and N,N-dimethyl-acrylamide.

According to yet a further particular embodiment of the inventive method, it is preferred when moiety (ii) and/or (ii) the second ethylenically unsaturated monomer, the homopolymer of which has a glass transition temperature Tg$^{(ii)}$ ranging from −100° C. to −10° C., especially from −60° C. to −20° C., is butyl acrylate (BA).

With respect to optional moiety (iv), as delineated hereinabove, moiety (iv) of the copolymer of the coating system produced by the inventive method is based on or derived from (1) perfluoroalkyl (meth)acrylates (PFA), (2) C$_{12}$-C$_{22}$-alkyl(meth)acrylates, especially C$_{12}$-C$_{22}$-alkyl(meth)acrylates forming semicrystalline homopolymers, preferably stearyl(meth)acrylates (SMA), and (3) mesogenic monomers comprising ethylenically unsaturated monomeric moieties, especially mesogenic monomers comprising (meth) acrylate monomeric units comprising side-chains and/or ester groups bearing mesogenic functionalities, especially biphenyl mesogen groups.

In this context, the term of mesogen(ic) monomers as used in the present invention particularly denotes monomers, when incorporated/interpolymerized in a polymeric structure, induce a liquid crystalline state within such polymeric structure. Furthermore, in this context, the term of mesogen (ic) groups or functionalities, respectively, as used in the present invention particularly denotes groups or functionalities inducing a liquid crystalline state within a polymeric structure. Examples of such mesogen(ic) groups or functionalities are e.g. biphenyl mesogen groups (e.g. mesogenic monomers including (meth)acrylate monomers with side-chains bearing biphenyl mesogen with different spacer lengths and a fixed tail, such as e.g. poly[ethyl-4'-((n-(methacryloyloxy)alkyl)oxy)-[1,1'-biphenyl]-4-carboxylate]s (i.e. n-PMLCM with n=3, 4, 5, 6) which can be used to incorporate crystalline domains in the polymer particles).

According to yet a further particular embodiment of the inventive method, it is preferred when optional moiety (iv) and/or the optional further monomer (iv) is selected from perfluoroalkyl (meth)acrylates (PFA) and stearyl(meth)acrylates (SMA).

According to yet another particular embodiment of the inventive method, it is preferred when moiety (i) and/or (i) the first ethylenically unsaturated monomer, the homopolymer of which has a glass transition temperature Tg$^{(i)}$ ranging from 30° C. to 200° C., especially from 40° C. to 150° C., is methyl methacrylate (MMA); and/or when moiety (ii) and/or (ii) the second ethylenically unsaturated monomer, the homopolymer of which has a glass transition temperature Tg$^{(ii)}$ ranging from −100° C. to −10° C., especially from −60° C. to −20° C., is butyl acrylate (BA); and/or when moiety (iv) and/or the optional further monomer (iv) is selected from perfluoroalkyl (meth)acrylates (PFA) and stearyl(meth)acrylates (SMA).

According to even yet another particular embodiment of the inventive method, it is preferred when moiety (i) and/or (i) the first ethylenically unsaturated monomer, the homopolymer of which has a glass transition temperature Tg$^{(i)}$ ranging from 30° C. to 200° C., especially from 40° C. to 150° C., is methyl methacrylate (MMA); and when moiety (ii) and/or (ii) the second ethylenically unsaturated monomer, the homopolymer of which has a glass transition temperature Tg$^{(ii)}$ ranging from −100° C. to −10° C., especially from −60° C. to −20° C., is butyl acrylate (BA); and when moiety (iv) and/or the optional further monomer (iv) is selected from perfluoroalkyl (meth)acrylates (PFA) and stearyl(meth)acrylates (SMA).

According to a particular embodiment of the first aspect of the present invention, there is provided a method for producing a coating system providing corrosion-protective properties when applied to metal surfaces, particularly in the form of a water-based (waterborne) composition, preferably dispersion (i.e. an emulsion or a latex, respectively), especially a method as described hereinabove, wherein the method comprises producing, via emulsion polymerization in a two-stage radical polymerization process, a copolymer comprising moieties of (i) methyl methacrylate (MMA), (ii) butyl acrylate (BA), (iii) a phosphate-group containing methacrylic monomer (PAM) and (iv) an optional further monomer selected from perfluoroalkyl (meth)acrylates (PFA) and stearyl(meth)acrylates (SMA), wherein:

(a) in a first stage (step), an emulsion prepolymerization of at least part of at least one of monomers (i), (ii) and/or optionally (iv) is performed in the absence of monomer (iii), so as to produce an emulsion prepolymerization product to be used as a seed in the subsequent second stage (step) (b); and then (b) in a second stage (step), the emulsion prepolymerization product resulting from stage (a) and the remainder of monomers (i), (ii) and optionally (iv), if any, are commonly polymerized together with and in the presence of monomer (iii), so as to yield a composition, preferably a dispersion (emulsion), which contains a copolymer comprising moieties of (i) methyl methacrylate (MMA), (ii) butyl acrylate (BA), (iii) a phosphate-group containing methacrylic monomer (PAM) and (iv) an optional further monomer selected from perfluoroalkyl (meth)acrylates (PFA) and stearyl(meth)acrylates (SMA), wherein (iii) the phosphate-group containing methacrylic monomer (PAM) is selected from phosphates and phosphate esters of polyalkylene glycol monomethacrylates.

This particular embodiment of the inventive method leads to particularly good results and an excellent performance of the resulting coating system.

With respect to the first stage (step) (a) of the inventive method, in the following typical and representative but non-limiting embodiments will be described.

Typically, the first stage (step) (a) may be performed in the presence of at least one polymerization initiator, especially a radical polymerization initiator. Such initiator ensures an efficient initiation or start of the polymerization reaction and thus an efficient reaction course. This ensures an efficient polymerization procedure within the first stage (step) (a).

Preferably, such polymerization initiator, especially a radical polymerization initiator, may be selected from the group consisting of thermal polymerization initiators, redox polymerization initiators and combinations thereof, particularly inorganic and/or organic persulfates, peroxides, hydroperoxides, perbenzoates, peralkanoates, azoinitiators and combinations thereof, more preferably from the group consisting of inorganic and/or organic persulfates and azobisisobutyronitrile (AIBN), particularly from the group consisting of inorganic persulfates of alkali or earth alkaline metals and azobisisobutyronitrile (AIBN).

As delineated before, apart from azoinitiators such as e.g. AIBN, stage (step) (a), i.e. polymerization, can also be performed in the presence of other polymerization initiators. The initiator system may, for example, be chosen among thermal initiators, redox initiators or combinations thereof, for example potassium or ammonium persulfates, tert-butyl hydroperoxide, cumene hydroperoxide, tert-butyl perbenzoate, tert-butyl 2-ethyl perhexanoate, hydrogen peroxide and benzoyl peroxide. Either oil- and/or water-soluble initiators may be used. Suitable reducing agents of a redox initiator system may include compounds, such as sulphur compounds with a low oxidation state, such as sulfites, hydrogen sulfites, alkali metal bisulfites, ketone adducts of bisulfites, such as acetone bisulfite, alkali metal disulfites, metabisulfites and its salts, thiosulfates, formaldehyde sulfoxylates and its salts, reducing nitrogen compounds, such as hydroxylamines, hydroxylamine hydrosulfate and hydroxylammonium salts, polyamines and reducing sugars, such as sorbose, fructose, glucose, lactose and derivatives thereof, enediols, such as ascorbic acid and isoascorbic acid, sulfinic acids, hydroxy alkyl sulfinic acids, such as hydroxy methyl sulfinic acid and 2-hydroxy-2-sulfinactic acid and its salts. Redox initiators are typically used in combination with trace amounts of metal such as iron, for example supplied as ferrous sulfate.

Usually, the first stage (step) (a) may also be performed in the presence of at least one surfactant. Also this embodiment ensures an efficient polymerization procedure.

Especially, such surfactant may be an anionic or non-ionic surfactant, especially selected from the group consisting of anionic organic sulfates and sulfonates and non-ionic alkylene oxides, especially ethylene and/or propylene oxides, and combinations thereof, preferably selected from organic sulfonates, particularly dodecyl diphenyloxide disulfonates.

As appropriate surfactants, there may particularly be used anionic surfactants, such as e.g. alkyl, alkyl phenyl or styrenated phenyl sulfates and sulfonates, or polymerizable anionic surfactants containing sulfates and sulfonates together with allyl, propenyl and propenyl phenyl polymerizable groups, or polymerizable non-ionic surfactants with hydrophilic part containing ethylene oxide or propylene oxide groups or mixtures of both together with polymerizable groups like allyl, propenyl and propenyl phenyl.

Furthermore, it may be advantageous when the first stage (step) (a) is performed in the presence of at least one buffer, especially an inorganic carbonate or hydrogen carbonate buffer.

Particularly, the first stage (step) (a) may be performed under neutral or acidic conditions, preferably under acidic conditions.

Particularly, the first stage (step) (a) may be performed in a water-based (i.e. waterborne) liquid milieu or carrier. Especially, the water-based (waterborne) liquid milieu or carrier additionally may comprise at least one polymerization initiator and/or at least one surfactant and/or at least one buffer, preferably each as defined hereinabove, and/or optionally at least one further additive. This ensures an efficient polymerization reaction under environmentally friendly conditions.

Furthermore, the first stage (step) (a) may be performed under various temperature conditions. Usually, the first stage (step) (a) may be performed at elevated temperatures. Especially, the first stage (step) (a) may be performed at a temperature in the range of from 40° C. to 200° C., especially in the range of from 50° C. to 150° C., preferably in the range of from 55° C. to 130° C., more preferably in the range of from 60° C. to 100° C.

Moreover, the first stage (step) (a) may be performed under various pressure conditions. Typically, the first stage (step) (a) may be performed at ambient pressure (1 bar or 101.325 kPa), at reduced pressure or at elevated pressure, preferably at ambient pressure (1 bar or 101.325 kPa).

Also, the first stage (step) (a) may be performed for various durations. Typically, the first stage (step) (a) may be performed for a duration in the range of from 0.01 to 24 hours, especially in the range of from 0.1 to 12 hours, preferably in the range of from 0.5 to 6 hours, more preferably in the range of from 0.75 to 4 hours.

In order to provide an efficient seed for the subsequent second stage (step) (b), it is advantageous to adjust the solid content level in the first stage (step) (a). Particularly, in this respect, the first stage (step) (a) may be performed until a solid content, based on the total weight of the emulsion prepolymerization product resulting from stage (a), of at least 5% by weight, especially of at least 7.5% by weight, preferably of at least 10% by weight, more preferably of at least 12.5% by weight, even more preferably of at least 15% by weight, most preferably of at least 20% by weight, has been reached. Especially, in this respect, the first stage (step) (a) may be performed until a solid content, based on the total weight of the emulsion prepolymerization product resulting from stage (a), in the range of from 5 to 80% by weight, especially in the range of from 7.5 to 60% by weight, preferably in the range of from 10 to 50% by weight, more preferably in the range of from 12.5 to 40% by weight, even more preferably in the range of from 15 to 35% by weight, most preferably in the range of from 20 to 30% by weight, has been reached.

According to a typical embodiment, the first stage (step) (a) may be performed in an at least essentially inert atmosphere, especially selected from nitrogen and noble gases, especially nitrogen. Especially, such procedure prevents undesired side-reactions, especially due to oxidation or hydrolysis.

Usually, the first stage (step) (a) may be performed as an emulsion polymerization, particularly as a radical emulsion polymerization, particularly as a miniemulsion polymerization, preferably with diameter sizes of the dispersed phase from 50 nm to 1 micrometer. This ensures producing coating systems with high-performance corrosion protection and excellent film-forming properties and superior adhesion.

According to IUPAC (International Union of Pure and Applied Chemistry), a miniemulsion is particularly defined as an emulsion in which the particles of the dispersed phase have diameters in the range from approximately 50 nm to 1 micrometer (see also Terminology of polymers and polymerization processes in dispersed systems, IUPAC Recommendations 2011, Pure and Applied Chemistry 83(12), 2229-2259, 2011).

Furthermore, also according to IUPAC (International Union of Pure and Applied Chemistry), a miniemulsion polymerization is particularly defined as a polymerization of a miniemulsion of monomers in which all of the polymerization occurs within preexisting monomer particles without the formation of new particles (see also Terminology of polymers and polymerization processes in dispersed systems, IUPAC Recommendations 2011, Pure and Applied Chemistry 83(12), 2229-2259, 2011).

More details with respect to the physical and chemical particularities with respect to miniemulsions and with respect to miniemulsion polymerization will be explained in more detail hereinbelow.

According to a particular embodiment of the present invention, it is advantageous when, after the first stage (step) (a) and/or before the second stage (step) (b), the emulsion prepolymerization product resulting from stage (a) and/or the polymerization milieu used in the second stage (step) (b) is/are neutralized or alkalized, preferably neutralized, or is/are adjusted to a neutral or slightly alkaline pH value, preferably to a neutral pH value, particularly by use of an alkaline agent. Especially, an undesired hydrolysis both of the phosphate or phosphate ester groups and of the acrylate linkages is thereby efficiently prevented.

With respect to the second stage (step) (b) of the inventive method, in the following typical and representative but non-limiting embodiments will be described.

Typically, also the second stage (step) (b) may be performed in the presence of at least one polymerization initiator, especially a radical polymerization initiator. This ensures an efficient polymerization procedure within the second stage (step) (b).

Especially, such polymerization initiator, especially radical polymerization initiator, as used in step (b) may preferably be selected from the group consisting of thermal polymerization initiators, redox polymerization initiators and combinations thereof, particularly inorganic and/or organic persulfates, peroxides, hydroperoxides, perbenzoates, peralkanoates, azoinitiators and combinations thereof, more preferably from the group consisting of inorganic and/or organic persulfates and azobisisobutyronitrile (AIBN), particularly form the group consisting of inorganic persulfates of alkali or earth alkaline metals and azobisisobutyronitrile (AIBN).

Basically, the same polymerization initiators as used in stage/step (a) may be used in stage/step (b). Consequently, for further details as to the polymerization initiators to be used, reference can be made to the above explanations for stage/step (a).

Basically, also the second stage (step) (b) may be performed in the presence of at least one surfactant. Also this measurement contributes to ensure an efficient polymerization procedure within the second stage (step) (b).

Especially, such surfactant may preferably be an anionic or non-ionic surfactant, especially selected from the group consisting of anionic organic sulfates and sulfonates and non-ionic alkylene oxides, especially ethylene and/or propylene oxides, and combinations thereof, preferably selected from organic sulfonates, particularly dodecyl diphenyloxide disulfonates.

Basically, the same surfactants as used in stage/step (a) may be used in stage/step (b). Consequently, for further details as to the surfactants to be used, reference can be made to the above explanations for stage/step (a).

However, according to a particular embodiment, the second stage (step) (b) may be performed without additional surfactant since moiety (iii) used in the second stage (step) (b) of the inventive method usually provides sufficient surfactant properties intrinsically. However, nevertheless, it is possible to use moiety (iii) in combination with an additional surfactant as delineated hereinbefore.

According to a particular embodiment, the second stage (step) (b) may be performed under neutral or slightly alkaline conditions, preferably under at least essentially neutral conditions. Especially, an undesired hydrolysis both of the phosphate or phosphate ester groups and of the acrylate linkages is thereby efficiently prevented.

Particularly, also the second stage (step) (b) may be performed in a water-based (waterborne) liquid milieu or carrier. Especially, the water-based (waterborne) liquid milieu or carrier may additionally comprise at least one polymerization initiator and/or at least one surfactant, preferably each as defined hereinabove, and/or optionally at least one further additive. This ensures an efficient polymerization reaction under environmentally friendly conditions.

Furthermore, also the second stage (step) (b) may be performed under various temperature conditions. Usually, the second stage (step) (b) may be performed at elevated temperatures. Especially, the second stage (step) (b) may be performed at a temperature in the range of from 40° C. to 200° C., especially in the range of from 50° C. to 150° C., preferably in the range of from 55° C. to 130° C., more preferably in the range of from 60° C. to 100° C.

Moreover, also the second stage (step) (b) may be performed under various pressure conditions. Usually, the second stage (step) (b) may be performed at ambient pressure (1 bar or 101.325 kPa), at reduced pressure or at elevated pressure, preferably at ambient pressure (1 bar or 101.325 kPa).

Also, the second stage (step) (b) may be performed for various durations. Typically, the second stage (step) (b) may be performed for a duration in the range of from 0.01 to 24 hours, especially in the range of from 0.1 to 12 hours, preferably in the range of from 0.5 to 6 hours, more preferably in the range of from 0.75 to 4 hours.

In order to provide an efficient performance for the final applications or uses of the resulting coating system, it is advantageous to adjust the solid content level also in the second stage (step) (b). Particularly, in this respect, the second stage (step) (b) may be performed until a solid content, based on the total weight of the polymerization product resulting from stage (b), of at least 25% by weight, especially of at least 30% by weight, preferably of at least 35% by weight, more preferably of at least 40% by weight, even more preferably of at least 45% by weight, most preferably of at least 50% by weight, has been reached. Especially, in this respect, the second stage (step) (b) may be performed until a solid content, based on the total weight of the polymerization product resulting from stage (b), in the range of from 25 to 80% by weight, especially in the range of from 30 to 75% by weight, preferably in the range of from 35 to 70% by weight, more preferably in the range of from 40 to 65% by weight, even more preferably in the range of from 45 to 60% by weight, most preferably in the range of from 45 to 55% by weight, has been reached.

According to a typical embodiment, also the second stage (step) (b) may be performed in an at least essentially inert atmosphere, especially selected from nitrogen and noble gases, especially nitrogen. Especially, such procedure prevents undesired side-reactions, especially due to oxidation or hydrolysis.

Usually, also the second stage (step) (b) may be performed as an emulsion polymerization, particularly as a radical emulsion polymerization, preferably with diameter sizes of the dispersed phase from 50 nm to 1 micrometer. This ensures producing coating systems with high-performance corrosion protection and excellent film-forming properties and superior adhesion.

One crucial aspect of the present invention is the incorporation and/or interpolymerization of active phosphate or phosphate ester groups via monomer (iii), i.e. the phosphate-group containing methacrylic monomer (PAM), which is selected from phosphates and phosphate esters of polyalkylene glycol monomethacrylates. The reactive methacrylic group in this monomer allows for the incorporation and/or interpolymerization of such monomer (iii) on behalf of the inventive method. The phosphate or phosphate ester active functional group, which remains in the resulting copolymer, enables an efficient phosphatization of the treated metal surfaces on behalf of application of the inventive coating system.

According to a typical embodiment of the present invention, monomer (iii), i.e. the phosphate-group containing methacrylic monomer (PAM), which is selected from phosphates and phosphate esters of polyalkylene glycol monomethacrylates, may comprise a phosphate group of the general formula (I)

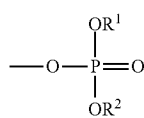

in which formula (I) $R^1$ and $R^2$, independently from each other, represent hydrogen or alkyl, preferably $C_1$-$C_{10}$-alkyl (preferably wherein both of $R^1$ and $R^2$ represent hydrogen at the same time).

Particularly, monomer (iii), i.e. the phosphate-group containing methacrylic monomer (PAM), which is selected from phosphates and phosphate esters of polyalkylene glycol monomethacrylates, may correspond to the following general formula (II):

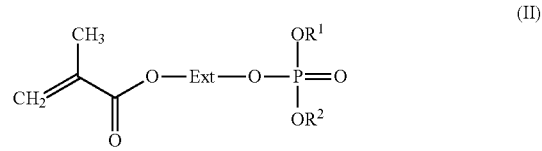

in which formula (II)
- $R^1$ and $R^2$, independently from each other, represent hydrogen or alkyl, preferably $C_1$-$C_{10}$-alkyl (preferably wherein both of $R^1$ and $R^2$ represent hydrogen at the same time),
- "Ext" represents an extender, particularly a chain extender, preferably on a polyalkylene glycol basis, more preferably on a polypropylene glycol (PPG) basis.

According to yet another particular embodiment of the present invention, monomer (iii), i.e. the phosphate-group containing methacrylic monomer (PAM), which is selected from phosphates and phosphate esters of polyalkylene glycol monomethacrylates, may correspond to the following general formula (III):

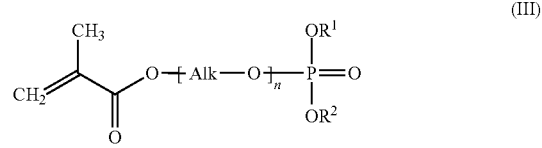

in which formula (III)
- $R^1$ and $R^2$, independently from each other, represent hydrogen or alkyl, preferably $C_1$-$C_{10}$-alkyl (preferably wherein both of $R^1$ and $R^2$ represent hydrogen at the same time),
- "Alk" represents an alkylene rest, preferably a $C_2$- or $C_3$-alkylene rest, more preferably a propylene rest;
- "n" is a positive integer, preferably in the range of from 2 to 200, especially in the range of from 2 to 100, preferably in the range of from 2 to 50, more preferably in the range of from 2 to 25.

According to yet another particular embodiment of the present invention, monomer (iii), i.e. the phosphate-group containing methacrylic monomer (PAM), which is selected from phosphates and phosphate esters of polyalkylene glycol monomethacrylates, may correspond to the following general formula (IV):

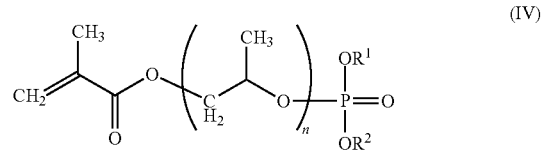

in which formula (IV)

R$^1$ and R$^2$, independently from each other, represent hydrogen or alkyl, preferably C$_1$-C$_{10}$-alkyl (preferably wherein both of R$^1$ and R$^2$ represent hydrogen at the same time), "n" is a positive integer, preferably in the range of from 2 to 200, especially in the range of from 2 to 100, preferably in the range of from 2 to 50, more preferably in the range of from 2 to 25.

According to a preferred embodiment of the present invention, monomer (iii), i.e. the phosphate-group containing methacrylic monomer (PAM), which is selected from phosphates and phosphate esters of polyalkylene glycol monomethacrylates, may be a mixture of monoalkylphosphate esters of polypropylene glycol monomethacrylate and dialkylphosphate esters of polypropylene glycol monomethacrylate, especially a mixture of mono(C$_1$-C$_{10}$-alkyl)phosphate esters of polypropylene glycol monomethacrylate and di(C$_1$-C$_{10}$-alkyl) phosphate esters of polypropylene glycol monomethacrylate, especially according to above formula (IV).

According to another preferred embodiment of the present invention, monomer (iii), i.e. the phosphate-group containing methacrylic monomer (PAM), may be a phosphate of polypropylene glycol monomethacrylate, especially a phosphate according to above formula (IV) where both of R$^1$ and R$^2$ represent hydrogen at the same time.

According to yet another preferred embodiment of the present invention, monomer (iii), the phosphate-group containing methacrylic monomer (PAM), which is selected from phosphates and phosphate esters of polyalkylene glycol monomethacrylates, may specifically be Sipomer® PAM-200 from Rhodia Solvay Group.

Particularly, monomer (iii), i.e. the phosphate-group containing methacrylic monomer (PAM), which is selected from phosphates and phosphate esters of polyalkylene glycol monomethacrylates, may be characterized by a molecular weight, especially an average molecular weight Mw, in the range of from 250 to 3,000 g/mol, especially in the range of from 300 to 600 g/mol, preferably of about 500 g/mol.

Furthermore, according to yet another particular embodiment, monomer (iii), i.e. the phosphate-group containing methacrylic monomer (PAM), which is selected from phosphates and phosphate esters of polyalkylene glycol monomethacrylates, may be characterized by a viscosity at 23° C. of 4,700 cP and/or by a viscosity at 25° C. of <5,500 cP and/or by a glass transition temperature Tg of 0° C. and/or by a total acid number in the range of from 50 to 200 mg KOH/g.

When monomer (iii) is selected in the above-indicated way, an inventive coating system with increased high-performance corrosion-protective properties results.

As indicated hereinabove, on behalf of the inventive method, an optional further monomer (iv) of the above definition (e.g. selected from perfluoroalkyl (meth)acrylates (PFA) and stearyl(meth)acrylates (SMA) etc., see above definition), may be used. Especially, such embodiment may be envisaged when the application properties of the resulting coating system shall be modified or tailored. As delineated hereinabove, the presence and interpolymerization of perfluoroalkyl (meth)acrylates (PFA), especially perfluorooctyl acrylate (POA), increases the hydrophobic (and also oleophobic) properties of the resulting copolymer and thus increases the hydrophobic (and also oleophobic) barrier properties of the whole inventive coating system whereas the presence and interpolymerization of stearyl(meth)acrylates (SMA), particularly stearyl acrylate (SA), leads to crystalline, especially nanocrystalline domains in the resulting copolymeric networks (wherein these crystalline, especially nanocrystalline domains inside the copolymeric matrix result in the formation of semi-crystalline copolymers having a core/shell-structure, wherein the presence of these crystalline domains significantly reduces the permeation and the adsorption of water and oxygen through the resulting coating).

When the optional further monomer (iv) is selected from perfluoroalkyl (meth)acrylates (PFA), it is preferred to use a perfluoroalkyl acrylate, preferably a perfluorooctyl acrylate (POA). This leads to optimum results in the final coating system.

When the optional further monomer (iv) is selected from stearyl(meth)acrylates (SMA), it is preferred to use a stearyl acrylate (SA). Also this embodiment leads to optimum results in the final coating system.

According to a particular embodiment, the method of the present invention results in producing a coating system, particularly in the form of a water-based (waterborne) composition, preferably dispersion (emulsion), which comprises at least one of the following copolymers:

(i)/(ii)/(iii)-copolymers and/or copolymers comprising moieties (i), (ii) and (iii), preferably with a (i)/(ii)/(iii)-weight ratio of (10-90)/(10-90)/(0.1-20), particularly (20-70)/(20-70)/(0.5-10), especially (40-60)/(40-60)/(1-5), however, with the proviso that the sum of the weight shares results in 100;

(i)/(ii)/(iii)/(iv)-copolymers and/or copolymers comprising moieties (i), (ii), (iii) and (iv), preferably with a (i)/(ii)/(iii)/(iv)-weight ratio of (20-60)/(10-50)/(0.1-20)/(10-50), particularly (25-50)/(20-40)/(0.5-10)/(20-40), especially (30-45)/(25-35)/(1-5)/(25-35), however, with the proviso that the sum of the weight shares results in 100;

(i)/(ii)/(iii)/(iv)-copolymers and/or copolymers comprising moieties (i), (ii), (iii) and (iv), preferably with a (i)/(ii)/(iii)/(iv)-weight ratio of (10-60)/(10-60)/(0.1-20)/(20-70), particularly (20-40)/(20-40)/(0.5-10)/(25-60), especially (25-35)/(25-35)/(1-5)/(30-50), however, with the proviso that the sum of the weight shares results in 100.

According to yet another particular embodiment, the method of the present invention results in producing a coating system, particularly in the form of a water-based (waterborne) composition, preferably dispersion (emulsion), which comprises at least one of the following copolymers:

MMA/BA/PAM-copolymers, preferably with a MMA/BA/PAM weight ratio of (10-90)/(10-90)/(0.1-20), particularly (20-70)/(20-70)/(0.5-10), especially (40-60)/(40-60)/(1-5), however, with the proviso that the sum of the weight shares results in 100;

MMA/BA/PAM/PFA-copolymers, especially MMA/BA/PAM/POA-copolymers, preferably with a MMA/BA/PAM/PFA weight ratio of (20-60)/(10-50)/(0.1-20)/(10-50), particularly (25-50)/(20-40)/(0.5-10)/(20-40), especially (30-45)/(25-35)/(1-5)/(25-35), however, with the proviso that the sum of the weight shares results in 100;

MMA/BA/PAM/SMA-copolymers, especially MMA/BA/PAM/SA-copolymers, preferably with a MMA/BA/PAM/SMA weight ratio of (10-60)/(10-60)/(0.1-20)/(20-70), particularly (20-40)/(20-40)/(0.5-10)/(25-60), especially (25-35)/(25-35)/(1-5)/(30-50), however, with the proviso that the sum of the weight shares results in 100.

According to a particular embodiment of the inventive method, the second stage (step) (b) may be followed by a post-polymerization step. Especially, post-polymerization may be performed so as to remove residual monomers. Particularly, post-polymerization may be performed at elevated temperatures. Especially, post-polymerization may be performed at a temperature in the range of from 40° C. to 200° C., especially in the range of from 50° C. to 150° C., preferably in the range of from 55° C. to 130° C., more preferably in the range of from 60° C. to 100° C. Especially, post-polymerization may be performed at ambient pressure (1 bar or 101.325 kPa), at reduced pressure or at elevated pressure, preferably at ambient pressure (1 bar or 101.325 kPa). Particularly, post-polymerization may be performed for a duration in the range of from 0.01 to 24 hours, especially in the range of from 0.1 to 12 hours, preferably in the range of from 0.5 to 6 hours, more preferably in the range of from 0.75 to 4 hours.

As delineated hereinabove, according to a particular embodiment of the inventive method, the method of the present invention is performed in the absence of organic solvents and/or in the absence of volatile organic compounds (VOCs). This leads to a high environmental compatibility. Also, this corresponds to harsh health and safety regulations and measurements, especially with respect to safety at work standards and industrial safety.

According to a particular embodiment of the inventive method, the method may be performed without any use of an optional monomer (iv). According to this specific embodiment, the present invention may then be directed to a method as described hereinabove, wherein the method comprises producing, via emulsion polymerization in a two-stage radical polymerization process, a copolymer comprising moieties of (i), (ii) and (iii), each as defined hereinabove, wherein:

(a) in a first stage (step), an emulsion prepolymerization of a part of monomers (i) and (ii) is performed in the absence of monomer (iii), so as to produce an emulsion prepolymerization product to be used as a seed in the subsequent second stage (step) (b); and then (b) in a second stage (step), the emulsion prepolymerization product resulting from stage (a) and the remainder of monomers (i) and (ii) are commonly polymerized together with and in the presence of monomer (iii), so as to yield a composition, preferably a dispersion (emulsion), which contains a copolymer comprising moieties of (i), (ii) and (iii).

According to the particular embodiment of the inventive method where the method may be performed without any use of an optional monomer (iv), then—according to this specific embodiment—the present invention may then be directed, according to a more preferred embodiment, to a method for producing a coating system providing corrosion-protective properties when applied to metal surfaces, particularly in the form of a water-based (waterborne) composition, preferably dispersion (emulsion), especially in accordance with the description of the inventive method given hereinabove, wherein the method comprises producing, via emulsion polymerization in a two-stage radical polymerization process, a copolymer comprising moieties of (i) methyl methacrylate (MMA), (ii) butyl acrylate (BA) and (iii) a phosphate-group containing methacrylic monomer (PAM), wherein:

(a) in a first stage (step), an emulsion prepolymerization of a part of monomers (i) and (ii) is performed in the absence of monomer (iii), so as to produce an emulsion prepolymerization product to be used as a seed in the subsequent second stage (step) (b); and then (b) in a second stage (step), the emulsion prepolymerization product resulting from stage (a) and the remainder of monomers (i) and (ii) are commonly polymerized together with and in the presence of monomer (iii), so as to yield a composition, preferably a dispersion (emulsion), which contains a copolymer comprising moieties of (i) methyl methacrylate (MMA), (ii) butyl acrylate (BA) and (iii) a phosphate-group containing methacrylic monomer (PAM), wherein (iii) the phosphate-group containing methacrylic monomer (PAM) is selected from phosphates and phosphate esters of polyalkylene glycol monomethacrylate, especially as defined hereinabove.

According to another particular embodiment of the inventive method, the method may be performed using an optional monomer (iv) selected from perfluoroalkyl (meth)acrylates (PFA), preferably perfluorooctyl acrylate (POA). According to this specific embodiment, the present invention may then be directed to a method as described hereinabove, wherein the method comprises producing, via emulsion polymerization in a two-stage radical polymerization process, a copolymer comprising moieties of (i), (ii) and (iii) as defined hereinabove and (iv) a perfluoroalkyl (meth)acrylate (PFA), preferably a perfluorooctyl acrylate (POA), wherein:

(a) in a first stage (step), an emulsion prepolymerization of a part of monomers (i) and (ii) and all of monomer (iv) is performed in the absence of monomer (iii), so as to produce an emulsion prepolymerization product to be used as a seed in the subsequent second stage (step) (b); and then (b) in a second stage (step), the emulsion prepolymerization product resulting from stage (a) and the remainder of monomers (i) and (ii) are commonly polymerized together with and in the presence of monomer (iii), so as to yield a composition, preferably a dispersion (emulsion), which contains a copolymer comprising moieties of (i), (ii) and (iii) as defined in any of the preceding claims and (iv) perfluoroalkyl (meth)acrylate (PFA), preferably perfluorooctyl acrylate (POA).

According to this particular embodiment of the inventive method, where the method may be performed using an optional monomer (iv) selected from perfluoroalkyl (meth)acrylates (PFA), preferably perfluorooctyl acrylate (POA), then—according to a more preferred variant of this specific embodiment—the present invention may then be preferably directed to a method for producing a coating system providing corrosion-protective properties when applied to metal surfaces, particularly in the form of a water-based (waterborne) composition, preferably dispersion (emulsion), especially in accordance with the description of the inventive method given hereinabove, wherein the method comprises producing, via emulsion polymerization in a two-stage radical polymerization process, a copolymer comprising moieties of (i) methyl methacrylate (MMA), (ii) butyl acrylate (BA), (iii) a phosphate-group containing methacrylic monomer (PAM) and (iv) a perfluoroalkyl (meth)acrylate (PFA), preferably a perfluorooctyl acrylate (POA), wherein:

(a) in a first stage (step), an emulsion prepolymerization of a part of monomers (i) and (ii) and all of monomer (iv) is performed in the absence of monomer (iii), so as to produce an emulsion prepolymerization product to be used as a seed in the subsequent second stage (step) (b); and then (b) in a second stage (step), the emulsion prepolymerization product resulting from stage (a) and the remainder of monomers (i) and (ii) are commonly polymerized together with and in the presence of monomer (iii), so as to yield a composition, preferably a dispersion (emulsion), which contains a copolymer comprising moieties of (i) methyl methacrylate (MMA), (ii) butyl acrylate (BA), (iii) a phosphate-group containing methacrylic monomer (PAM) and (iv) perfluoroalkyl (meth)acrylate (PFA), preferably perfluorooctyl acrylate (POA), wherein (iii) the phosphate-group containing methacrylic monomer (PAM) is selected from phosphates and phosphate esters of polyalkylene glycol monomethacrylates, especially as defined hereinabove.

According to yet another particular embodiment of the inventive method, the method may be performed using an optional monomer (iv) selected from stearyl(meth)acrylates (SMA), preferably a stearyl acrylate (SA). According to this specific embodiment, the present invention is then directed to a method as described hereinabove, wherein the method comprises producing, via emulsion polymerization in a two-stage radical polymerization process, a copolymer comprising moieties of (i), (ii) and (iii) as defined hereinabove and (iv) a stearyl(meth)acrylate (SMA), preferably a stearyl acrylate,
wherein:

(a) in a first stage (step), an emulsion prepolymerization of all of monomer (iv) is performed in the absence of monomers (i), (ii) and (iii), so as to produce an emulsion prepolymerization product to be used as a seed in the subsequent second stage (step) (b); and then (b) in a second stage (step), the emulsion prepolymerization product resulting from stage (a) and monomers (i) and (ii) are commonly polymerized together with and in the presence of monomer (iii), so as to yield a composition, preferably a dispersion (emulsion), which contains a copolymer comprising moieties of (i), (ii) and (iii) as defined in any of the preceding claims and (iv) a stearyl(meth)acrylate (SMA).

According to this particular embodiment of the inventive method where the method may be performed using an optional monomer (iv) selected from stearyl(meth)acrylates (SMA), preferably a stearyl acrylate, then—according to a more preferred variant of this specific embodiment—the present invention may then preferably be directed to a method for producing a coating system providing corrosion-protective properties when applied to metal surfaces, particularly in the form of a water-based (waterborne) composition, preferably dispersion (emulsion), especially in accordance with the description of the inventive method given hereinabove, wherein the method comprises producing, via emulsion polymerization in a two-stage radical polymerization process, a copolymer comprising moieties of (i) methyl methacrylate (MMA), (ii) butyl acrylate (BA), (iii) a phosphate-group containing methacrylic monomer (PAM) and (iv) a stearyl(meth)acrylate (SMA), preferably a stearyl acrylate,
wherein:

(a) in a first stage (step), an emulsion prepolymerization of all of monomer (iv) is performed in the absence of monomers (i), (ii) and (iii), so as to produce an emulsion prepolymerization product to be used as a seed in the subsequent second stage (step) (b); and then (b) in a second stage (step), the emulsion prepolymerization product resulting from stage (a) and monomers (i) and (ii) are commonly polymerized together with and in the presence of monomer (iii), so as to yield a composition, preferably a dispersion (emulsion), which contains a copolymer comprising moieties of (i) methyl methacrylate (MMA), (ii) butyl acrylate (BA), (iii) a phosphate-group containing methacrylic monomer (PAM) and (iv) a stearyl(meth)acrylate (SMA), wherein (iii) the phosphate-group containing methacrylic monomer (PAM) is selected from phosphates and phosphate esters of polyalkylene glycol monomethacrylates, especially as defined hereinabove.

The coating system produced by the inventive method may provide corrosion-protective properties to any kind of metal surfaces, especially metal surfaces of iron or iron-containing alloys, such as particularly steel, metal surfaces of aluminum and aluminum-containing alloys and metal surfaces of magnesium and magnesium-containing alloys.

On the whole, the present invention provides an efficient and economic method for producing, under environmentally compatible conditions and with high yields, a coating system providing high-performance corrosion-protective properties when applied to metal surfaces while possessing at the same time excellent adhesion properties with respect to the metal surfaces to be treated. The multitude of the respective particularities and advantages linked to the inventive method and to the resulting coating system as well as to its uses and applications have been discussed in detail hereinbefore, so that reference can be made to the above explanations in this respect.

According to a second aspect of the present invention, the present invention further refers to a coating system providing corrosion-protective properties when applied to metal surfaces, particularly in the form of a water-based (waterborne) composition, preferably in the form of a dispersion (i.e. an emulsion or latex, respectively), wherein the coating system is obtainable by a method as defined hereinabove.

In other words, according to this aspect of the present invention, the present invention is directed to a coating system providing corrosion-protective properties when applied to metal surfaces, particularly in the form of a water-based (waterborne) composition, preferably in the form of a dispersion (emulsion),
wherein the coating system contains a copolymer comprising moieties of (i), (ii), (iii) and optionally (iv) as defined hereinabove.

According to a preferred embodiment, pursuant to this aspect of the present invention, the present invention is directed to a coating system providing corrosion-protective properties when applied to metal surfaces, particularly in the form of a water-based (waterborne) composition, preferably in the form of a dispersion (i.e. an emulsion or latex, respectively), wherein the coating system contains a copolymer comprising moieties of (i) methyl methacrylate (MMA), (ii) butyl acrylate (BA), (iii) a phosphate-group containing methacrylic monomer (PAM) and (iv) an optional further monomer selected from perfluoroalkyl (meth)acrylates (PFA) and stearyl(meth)acrylates (SMA),
wherein (iii) the phosphate-group containing methacrylic monomer (PAM) is selected from phosphates and phosphate esters of polyalkylene glycol monomethacrylates, especially as defined hereinabove.

In the present invention, the inventive coating system may synonymously also be denoted as "binder or binding system", "anticorrosion coating application binder", "coating application binder" and the like.

Particularly, the coating system of the present invention is typically characterized by any of the features as defined hereinabove with respect to the inventive method. Thus, in order to avoid unnecessary repetitions, reference may be made thereto.

According to a particular embodiment, the coating system of the present invention may additionally comprise at least one surfactant (especially as defined hereinabove for method stages/steps (a) and (b)). This leads to an improvement as to stability and processability of the inventive coating system.

Furthermore, it may also be advantageous when the coating system of the present invention may additionally comprise at least one buffer. This also leads to an improvement as to stability and processability of the inventive coating system.

Moreover, according to a particular embodiment, it may also be advantageous when the coating system of the present invention has a neutral or slightly alkaline pH value. This also improves stability and processability of the inventive coating system; especially, an undesired hydrolysis of the phosphate or phosphate ester groups or the acrylate linkages of the copolymer is thereby prevented.

According to another particular embodiment, the coating system of the present invention may have a solid content, based on the total weight of the coating system, of at least 25% by weight, especially of at least 30% by weight, preferably of at least 35% by weight, more preferably of at least 40% by weight, even more preferably of at least 45% by weight, most preferably of at least 50% by weight. This leads to a particularly high performance with respect to anticorrosion applications and especially also with respect to improved film-forming properties during application.

Particularly, it is advantageous for these reasons when the coating system of the present invention may have a solid content, based on the total weight of the coating system, in the range of from 25 to 80% by weight, especially in the range of from 30 to 75% by weight, preferably in the range of from 35 to 70% by weight, more preferably in the range of from 40 to 65% by weight, even more preferably in the range of from 45 to 60% by weight, most preferably in the range of from 45 to 55% by weight.

According to a particular embodiment of the present invention, particularly good results are obtained when the coating system of the present invention comprises the copolymer with absolute particle sizes, especially absolute particle diameters, in the range of from 50 nm to 5 micrometers, especially in the range of from 50 nm to 1 micrometers, preferably in the range of from 50 nm to 750 nm, more preferably in the range of from 60 nm to 500 nm, even more preferably in the range of from 60 nm to 250 nm. This leads to good film-forming properties and to high-performance corrosion protection.

Typically, according to yet a further particular embodiment of the present invention, the coating system of the present invention may particularly comprise at least one of the following copolymers (wherein the moieties (i), (ii), (iii) and (iv) each correspond to the definition given hereinabove):
  (i)/(ii)/(iii)-copolymers and/or copolymers comprising moieties (i), (ii) and (iii), preferably with a (i)/(ii)/(iii)-weight ratio of (10-90)/(10-90)/(0.1-20), particularly (20-70)/(20-70)/(0.5-10), especially (40-60)/(40-60)/(1-5), however, with the proviso that the sum of the weight shares results in 100;
  (i)/(ii)/(iii)/(iv)-copolymers and/or copolymers comprising moieties (i), (ii), (iii) and (iv), preferably with a (i)/(ii)/(iii)/(iv)-weight ratio of (20-60)/(10-50)/(0.1-20)/(10-50), particularly (25-50)/(20-40)/(0.5-10)/(20-40), especially (30-45)/(25-35)/(1-5)/(25-35), however, with the proviso that the sum of the weight shares results in 100;
  (i)/(ii)/(iii)/(iv)-copolymers and/or copolymers comprising moieties (i), (ii), (iii) and (iv), preferably with a (i)/(ii)/(iii)/(iv)-weight ratio of (10-60)/(10-60)/(0.1-20)/(20-70), particularly (20-40)/(20-40)/(0.5-10)/(25-60), especially (25-35)/(25-35)/(1-5)/(30-50), however, with the proviso that the sum of the weight shares results in 100.

Typically, according to yet another particular embodiment of the present invention, the coating system of the present invention may particularly comprise at least one of the following copolymers:
  MMA/BA/PAM-copolymers, preferably with a MMA/BA/PAM weight ratio of (10-90)/(10-90)/(0.1-20), particularly (20-70)/(20-70)/(0.5-10), especially (40-60)/(40-60)/(1-5), however, with the proviso that the sum of the weight shares results in 100;
  MMA/BA/PAM/PFA-copolymers, especially MMA/BA/PAM/POA-copolymers, preferably with a MMA/BA/PAM/PFA weight ratio of (20-60)/(10-50)/(0.1-20)/(10-50), particularly (25-50)/(20-40)/(0.5-10)/(20-40), especially (30-45)/(25-35)/(1-5)/(25-35), however, with the proviso that the sum of the weight shares results in 100;
  MMA/BA/PAM/SMA-copolymers, especially MMA/BA/PAM/SA-copolymers, preferably with a MMA/BA/PAM/SMA weight ratio of (10-60)/(10-60)/(0.1-20)/(20-70), particularly (20-40)/(20-40)/(0.5-10)/(25-60), especially (25-35)/(25-35)/(1-5)/(30-50), however, with the proviso that the sum of the weight shares results in 100.

These specific copolymers lead to a highly efficient corrosion protection, on the one hand, and to a highly efficient adhesion to metal surfaces, on the other hand, while having at the same time excellent film forming properties.

As described above, the coating system of the present invention results in a multitude of advantages and superior properties, as described hereinabove.

For further details and embodiments with respect to the inventive coating system, reference can therefore be made to the above explanations and description of the inventive method according to the first aspect of the present invention, which apply in the same manner with respect to the inventive coating system.

The inventive coating system produced by the inventive method described hereinabove may provide corrosion-protective properties to any kind of metal surfaces, especially metal surfaces of iron or iron-containing alloys, such as particularly steel, metal surfaces of aluminum and aluminum-containing alloys and metal surfaces of magnesium and magnesium-containing alloys.

On the whole, according to the second aspect of the present invention, the present invention provides an efficient and economic as well as environmentally compatible coating system which is able to provide high-performance corrosion-protective properties when applied to metal surfaces while possessing at the same time excellent adhesion properties with respect to the metal surfaces to be treated.

Furthermore, according to a third aspect of the present invention, the present invention also refers to the various uses or applications of the coating system of the present invention as described hereinabove.

Thus, according to a first use aspect, the present invention is directed to the use of an inventive coating system, as defined hereinabove, for providing corrosion protection to metal surfaces, i.e. metal surfaces of any kind, such as metal surfaces of iron or iron-containing alloys, such as particularly steel, metal surfaces of aluminum and aluminum-containing alloys and metal surfaces of magnesium and magnesium-containing alloys, especially iron or iron-containing metal surfaces, preferably steel surfaces. In this respect, according to a particular embodiment of such use, the coating system may be applied to the metal surfaces to be provided with corrosion protection, followed by a drying step, particularly such that a polymeric film results which adheres to the metal surfaces to be protected, especially with a film thickness (based on the dry film) in the range of from 5 to 500 micrometers, preferably 10 to 250 micrometers, especially 20 to 150 micrometers, particularly 25 to 100 micrometers. Especially, the drying step may be performed under controlled conditions, particularly at controlled temperatures and/or humidity; thereby, film formation behavior and phosphatization reaction on the treated metal surfaces can be controlled. According to a particular embodiment, the drying step may be performed at temperatures in the range of from 20 to 80° C. and/or at a relative humidity in the range of from 30% to 80%. For instance, the drying step may be performed at temperatures in the range of from 20 to 30° C., preferably at about 23° C., and/or at a relative humidity in the range of from 50% to 70% or in the range from 60% to 80%, preferably at about 60%, particularly to increase phosphatization of the treated metal surfaces; by the application of relatively low temperatures and/or high relative humidity levels particularly phosphatization on the treated metal surfaces can be favored. For instance, the drying step may also be performed at temperatures in the range of from 50 to 70° C., preferably at about 60° C., particularly to improve film formation and/or film homogeneity or coherence; by the application of higher temperatures particularly film formation and/or film homogeneity or coherence on the treated metal surfaces can be favored (e.g. to obtain more homogeneous and/or more coherent films).

Furthermore, according to another use aspect, the present invention is also directed to the use of an inventive coating system, as defined hereinabove, in paints, lacquers, varnishes, colors, impregnations, glazes, enamels and finishes for providing corrosion-protective properties to metal surfaces.

For further details and embodiments with respect to the inventive uses and applications, reference can therefore be made to the above explanations and description of the other inventive aspects, which apply in the same manner with respect to this inventive aspect.

Moreover, according to yet another aspect of the present invention (i.e. fourth aspect), the present invention also refers to paints, lacquers, varnishes, colors, impregnations, glazes, enamels and finishes with corrosion-protective properties, comprising an inventive coating system, as defined hereinabove. For further details and embodiments with respect to this inventive aspect, reference can therefore be made to the above explanations and description of the other inventive aspects, which apply in the same manner with respect to this inventive aspect.

Further, according to yet another aspect of the present invention (i.e. fifth aspect), the present invention relates to a method for providing corrosion-protective properties to metal surfaces, wherein the method comprises a step of applying an inventive coating system, as defined hereinabove, to the metal surfaces to be provided with corrosion protection.

In this respect, according to a particular embodiment of such method, the step of applying the coating system to the metal surfaces may usually be followed by a drying step, particularly such that a polymeric film results which adheres to the metal surfaces to be protected, especially with a film thickness (based on the dry film) in the range of from 5 to 500 micrometers, preferably 10 to 250 micrometers, especially 20 to 150 micrometers, particularly 25 to 100 micrometers.

Especially, the drying step may be performed under controlled conditions, particularly at controlled temperatures and/or humidity; thereby, film formation behavior and phosphatization reaction on the treated metal surfaces can be controlled. According to a particular embodiment, the drying step may be performed at temperatures in the range of from 20 to 80° C. and/or at a relative humidity in the range of from 30% to 80%. For instance, the drying step may be performed at temperatures in the range of from 20 to 30° C., preferably at about 23° C., and/or at a relative humidity in the range of from 50% to 70% or in the range from 60% to 80%, preferably at about 60%, particularly to increase phosphatization of the treated metal surfaces; by the application of relatively low temperatures and/or high relative humidity levels particularly phosphatization on the treated metal surfaces can be favored. For instance, the drying step may also be performed at temperatures in the range of from 50 to 70° C., preferably at about 60° C., particularly to improve film formation and/or film homogeneity or coherence; by the application of higher temperatures particularly film formation and/or film homogeneity or coherence on the treated metal surfaces can be favored (e.g. to obtain more homogeneous and/or more coherent films).

For further details and embodiments with respect to this inventive aspect, reference can therefore be made to the above explanations and description of the other inventive aspects, which apply in the same manner with respect to this inventive aspect.

Finally, according to yet a further aspect of the present invention (i.e. sixth aspect), there is also provided a metal surface of an article, provided with corrosion-protective properties, wherein the metal surface has been treated with an inventive coating system, as defined hereinabove (preferably by the inventive of the fifth invention aspect as described hereinbefore). For further details and embodiments with respect to this inventive aspect, reference can therefore be made to the above explanations and description of the other inventive aspects, which apply in the same manner with respect to this inventive aspect.

Thus, on the whole, the present invention provides an efficient method for producing coating systems providing corrosion-protective properties when applied to metal surfaces and also provides high-performance coating systems providing corrosion-protective properties to metal surfaces treated therewith. As delineated hereinbefore, the present invention, namely both the inventive process as well as the coating system resulting therefrom and the uses and applications thereof, is linked to a multitude of particularities and advantages, which clearly distinguish the present invention from the disadvantageous prior art techniques.

Further embodiments, modifications and variations of the present invention can readily be recognized and implemented by the skilled practitioner when reading the description, without leaving the scope of the present invention.

The present invention is illustrated, in the following, with reference to Examples, which, however, shall not restrict or limit the present invention in any way.

EXAMPLES

Part a: Synthesis of Inventive Coating Systems
1. Inventive Coating Systems on the Basis of Poly(MMA/BA/Phosphated Surfmer)

The process consists of the following steps with the different components for the anticorrosion coating application binder. Example: MMA/BA:50/50

Waterborne Polymer Dispersion Synthesis (Latex Synthesis)

Mixing the aqueous phase on one side and the organic phase on the other by magnetic stirring. The organic phase contains the monomers (methyl methacrylate=MMA/BA=butyl acrylate). The aqueous phase is prepared by mixing the emulsifier (Dowfax® 2A1 from Dow Chemicals, i.e. an anionic surfactant on the basis of an alkyldiphenyloxide disulfonate), the buffer (NaHCO$_3$) and the water by magnetic stirring.

Introducing the aqueous phase in the reactor and heating it up to the reaction temperature (70° C.) before inserting the initiator (KPS=potassium persulfate) in a shot and proceeding with the feeding of the organic phase.

The monomers (MMA/BA) are fed for 3 hours and the final solids content is 13 wt. %. In this way the initial seed is produced.

Using the initial seed to produce a seeded semibatch emulsion polymerization in which the rest of the monomers are added in a preemulsion together with water, the surfactant and a shot of initiator (KPS).

A conventional anionic surfactant (DOWFAX® 2A1) is used

A phosphated surfmer (Sipomer® PAM-200 from Rhodia Solvay Group) is used. The preemulsion pH is neutralized by addition of ammonia solution.

The preemulsified monomers (MMA/BA) are fed and the final solids content of the latex is 50%.

A post-polymerization is carried out to get rid of the residual monomer. The temperature is kept at 70° C. for 1 hour.

Example of the Synthesis of Poly(MMA/BA/Phosphated Surfmer)

In this example, the synthesis of waterborne binder for anticorrosion coating applications is described. The formulation in Table 1 is used to produce 500 g of seed, at 13% solids content. In Table 2 the formulation used to produce 500 g of latex, at 50% solids content is presented.

TABLE 1

Formulations used in the synthesis of the seed

| SEED | initial charge (g) | feed (g) |
|---|---|---|
| MMA | — | 31.3 |
| BA | — | 31.3 |
| Water | 436.7 | — |
| DOWFAX ® 2A1 | 0.63 | — |
| KPS | 0.313 | — |
| NaHCO$_3$ | 1.035 | — |

MMA: methyl methacrylate
BA: butyl acrylate
KPS: potassium persulfate
DOWFAX ® 2A1: dodecyldiphenyloxide disulfonate (45 wt. % active matter, Dow Chemicals)

TABLE 2

Formulations used in the synthesis of waterborne binder for anticorrosion applications

| | | Feeding | | | | | |
|---|---|---|---|---|---|---|---|
| LATEX | Initial charge Seed (g) | MMA (g) | BA (g) | KPS (g) | Dowfax ® 2A1 (g) | Sipomer ® PAM-200 (g) | Water (g) |
| A | 107 | 119 | 119 | 0.313 | 5 | / | 149.77 |
| B | 107 | 119 | 119 | 0.313 | / | 5 | 149.77 |

MMA: methyl methacrylate
BA: butyl acrylate
KPS: potassium persulfate
DOWFAX ® 2A1: dodecyldiphenyloxide disulfonate (45 wt. % active matter, Dow Chemicals)
Sipomer ® PAM-200: phosphate esters of polypropylene glycole monomethacrylate (Rhodia Solvay Group)

As it has been stated in the detailed description, the process consists of two main steps. In the first one, a seed is prepared, and in the second one, the seed is further polymerized by seeded semibatch emulsion polymerization.

Preparation of the Seed

The aqueous phase is obtained by dissolving the emulsifier (DOWFAX© 2A1) and the carbonate buffer (NaHCO$_3$) in water. Then it is transferred in to the reactor and the temperature is increased to 70° C. while bubbling nitrogen and agitation at 130 rpm. After reaching the desired temperature a shot of initiator (0.313 g of KPS in 5 g of water) is added into the reactor, and the monomers are fed as a preemulsion for 3 hours. In this way a seed with solids content of 13% is obtained. After the feeding the reaction is kept at 70° C. for 1 hour.

Seeded Semibatch Emulsion Polymerization

A certain amount of seed (107 g) is loaded into the reactor and the temperature is increased to 70° C. while bubbling nitrogen at 130 rpm of stirring. A shot of initiator is added (0.313 g of KPS in 5 g of water) and the rest of the monomers are fed as a preemulsion for 3 hours. This strategy is used to increase the solids content up to 50 wt. %.

For latex A, pH correction is not done.

For latex B, before starting the feeding, the preemulsion is corrected to neutral pH in order to avoid the hydrolysis of either phosphate ester or acrylate linkage.

After the feeding the reaction is kept at 70° C. for 1 hour.

2. Inventive Coating Systems on the Basis of Poly(POA/MMA/BA/Phosphated Surfmer)

The process consists of the following steps with the different components for the anticorrosion coating application binder, containing perfluorinated monomer (i.e. perfluorooctyl acrylate=POA). Example: POA/MMA/BA:30/40/30)

Waterborne Polymer Dispersion Synthesis (Latex Synthesis)

Mixing the aqueous phase on the side and the organic phase on the other by magnetic stirring.

The organic phase contains the monomers (POA, MMA, BA). The amount of POA corresponds to the total amount in the formulation, while the amount of MMA and BA is 7.88 wt. % of the total in the formulation. This mixture is stirred for 15 minutes at 800 rpm magnetically. The aqueous phase is prepared by mixing the emulsifier (Dowfax® 2A1) and water by magnetic stirring.

Mixing both the aqueous phase and the organic phase initially by magnetic stirring for 15 minutes at 800 rpm. The coarse emulsion is then sonified (operating at 8-output control and 80% duty cycle for 15 minutes in an ice-bath and under magnetic stirring). This step produces a stable miniemulsion.

Introducing the miniemulsion in the reactor and heating it up to the reaction temperature before inserting the initiator (AIBN) in a shot and proceeding with the polymerization. This way the initial seed is produced. The reaction temperature is set at 70° C. and the batch polymerization is carried out for 30 minutes.

Using the above seed in a seeded semibatch emulsion polymerization in which the rest of the monomers are added in a preemulsion together with water and the phosphated surfmer (Sipomer PAM 200). The preemulsion pH is neutralized by addition of ammonia solution.

The monomers fed are MMA/BA and the final solids content of the latex is 50%.

A post polymerization is carried out to get rid of the residual monomer. The temperature is kept at 70° C. for 1 hour.

Example of the Synthesis of Poly(POA/MMA/BA/Phosphated Surfmer)

In this example, the synthesis of a waterborne binder for anticorrosion applications, containing perfluorinated monomer, is described. The formulation (Table 3) is used to produce 500 g of latex.

TABLE 3

Formulations used in the synthesis of waterborne binder for anticorrosion applications

|  |  | Miniemulsion (g) | Preemulsion (g) |
|---|---|---|---|
| Oil phase | POA | 74.95 | — |
|  | MMA | 9.86 | 90.07 |
|  | BA | 9.86 | 65.09 |
|  | AIBN | 0.95 | — |
| Aqueous phase | Water | 220.92 | 28.93 |
|  | Dowfax ® 2A1 | 1.89 | — |
|  | Sipomer ® PAM-200 | — | 5 |

MMA: methyl methacrylate
BA: butyl acrylate
POA: perfluorooctyl acrylate
AIBN: azobisisobutyronitrile
DOWFAX ® 2A1: dodecyldiphenyloxide disulfonate (45 wt % active matter, Dow Chemicals)
Sipomer ® PAM-200: phosphate esters of polypropylene glycole monomethacrylate (Rhodia Solvay Group)

As it as been stated in the detailed description, the process consists of two main steps. In the first one the seed is prepared by miniemulsion polymerization and in the second one it is further polymerized by seeded semibatch emulsion polymerization.

Preparation of the Seed

The oil phase is composed by the monomer mixture (POA/MMA/BA: 79.2/10.4/10.4). This mixture is stirred for 15 min at 800 rpm magnetically. The aqueous phase is obtained by dissolving the emulsifier (DOWFAX® 2A1). The coarse emulsion is prepared by adding the homogeneous organic phase to the aqueous phase; then it is stirred for 15 min at 800 rpm magnetically. Using a high shear device (Digital Branson Sonifier), the coarse emulsion is sonified (operating at 8-output control and 80% duty cycle for 15 min in an ice-bath under magnetic stirring). Once sonified, the resulting miniemulsion is placed in the reactor and the temperature is increased to 70° C. while bubbling nitrogen and stirring at 130 rpm. After reaching the desired temperature, a shot of initiator (0.95 g of AIBN in 5 g of MMA) is added into the reactor, and the miniemulsion is polymerized for 30 minutes.

Feeding

Once the seed is produced by miniemulsion polymerization, the seeded semibatch emulsion polymerization is carried out. The rest of the monomers are fed as a preemulsion for 3 hours. This strategy is used to increase the solids content up to 50 wt. %. Before starting the feeding, the pH of the preemulsion is neutralized in order to avoid the hydrolysis of either phosphate ester or acrylate linkage. After the feeding the reaction is kept at 70° C. for 1 h.

3. Inventive Coating Systems on the Basis of Poly(SA/MMA/BA/Phosphated Surfmer)

The process consists of the following steps with the different components for the anticorrosion coating application binder, containing nanocrystalline domains. Example: SA/MMA/BA:40/30/30.

Waterborne Polymer Dispersion Synthesis (Latex Synthesis)

Keep the stearyl acrylate (SA) in melted state at 60° C.

Mixing the aqueous phase on the side and the organic phase on the other by magnetic stirring for 15 min at 800 rpm of stirring.

The organic phase contains the monomer (SA). The amount of SA corresponds to the total amount in the formulation. The aqueous phase is prepared by mixing the emulsifier (Dowfax® 2A1), the buffer and water by magnetic stirring; then it is heated up to 40° C.

Mixing both the aqueous phase and the organic phase initially by magnetic stirring for 15 minutes at 800 rpm. The coarse emulsion is then sonified (operating at 8-output control and 80% duty cycle for 15 minutes in an ice-bath and under magnetic stirring). This step produces a stable miniemulsion.

Introducing the miniemulsion in the reactor and heating it up to the reaction temperature before inserting the initiator (AIBN) in a shot and proceeding with the polymerization. This way the initial seed is produced. The reaction temperature is set at 70° C. and the batch polymerization is carried out for 3 hours until complete conversion of SA.

Using the initial seed in a seeded semibatch emulsion polymerization in which the rest of the monomers are added in a preemulsion together with water and the phosphated surfmer (Sipomer© PAM-200). The preemulsion pH is neutralized by addition of ammonia solution.

The monomers fed are MMA/BA and the final solids content of the latex is 45%.

A post polymerization is carried out to get rid of the residual monomer. The temperature is kept at 70° C. for 1 h.

Example of the Synthesis of Poly(SA/MMA/BA/Phosphated Surfmer)

In this example, the synthesis of a waterborne binder for anticorrosion applications, containing nanocrystalline domains, is described. The formulation (Table 4) is used to produce the seed based on SA semicrystalline particles while the formulation represented in Table 5 is used to produce the final latex containing nanocrystalline domains.

TABLE 4

Formulations used in the synthesis of the seed

| SEED | | Miniemulsion (g) |
|---|---|---|
| Oil phase | SA | 90 |
| | MMA | 3 |
| | AIBN | 0.46 |
| Aqueous phase | DOWFAX ® 2A1 | 1.8 |
| | Water | 247.5 |
| | NaHCO3 | 0.144 |

TABLE 5

Formulations used in the synthesis of waterborne binder containing nanocrystalline domains for anticorrosion applications

| FEED | MMA (g) | BA (g) | KPS (g) | SIPOMER ® PAM-200 (g) | Water (g) |
|---|---|---|---|---|---|
| | 62.5 | 67.5 | 0.675 | 4.5 | 27.5 |

MMA: methyl methacrylate
BA: butyl acrylate
SA: stearyl acrylate
AIBN: azobisisobutyronitrile
KPS: potassium persulfate
DOWFAX ® 2A1: dodecyldiphenyloxide disulfonate (45 wt. % active matter, Dow Chemicals)
SIPOMER ® PAM-200: phosphate esters of polypropylene glycole monomethacrylate (Rhodia Solvay Group)

As it has been stated in the detailed description, the process consists of two main steps. In the first one, a seed is prepared by batch miniemulsion polymerization and in the second one, it is further polymerized by seeded semibatch emulsion polymerization.

Preparation of the Seed

The coarse miniemulsion is prepared by adding the melted SA to the pre-heated aqueous phase; then it is stirred for 15 min at 800 rpm magnetically. The aqueous phase is obtained by dissolving the emulsifier (DOWFAX® 2A1) and the carbonate buffer (NaHCO$_3$) in water. Using a high shear device (Digital Branson Sonifier), the coarse preemulsion is sonified (operating at 8-output control and 80% duty cycle for 5 min in an ice-bath under magnetic stirring). Once sonified, the resulting miniemulsion is placed in the reactor and the temperature is increased to 70° C. while bubbling nitrogen and 130 rpm of stirring. After reaching the desired temperature a shot of initiator (0.46 g of AIBN in 3 g of MMA) is added into the reactor, and it is polymerized for 3 hours batchwise until complete conversion of SA is reached.

Feeding

Once the seed, containing semicrystalline Poly(SA) particles, is produced by miniemulsion polymerization, the seeded semibatch emulsion polymerization is carried out. Therefore a new shot of initiator is added (0.675 g (SA40) or 0.56 g (SA50) of KPS in 5 g of water) and the rest of the monomers are fed as a preemulsion for 3 hours. This strategy is used to increase the solids content up to 45 wt. %. Before starting the feeding, the pH of the preemulsion is neutralized in order to avoid the hydrolysis of either phosphate ester or acrylate linkage. After the feeding the reaction is kept at 70° C. for 1 h.

Physical Description of the Polymerization:
Emulsion Polymerization Vs. Miniemulsion Polymerization Emulsion polymerization is an oil-in-water emulsion stabilized by surfactant which is polymerized using a free-radical initiator. In this process the nucleation of polymer particles takes place by entry of radicals into micelles (heterogeneous or micellar nucleation) or by precipitation of growing oligoradicals in the aqueous phase (homogeneous nucleation).

Although droplet nucleation is possible (by entry of oligoradicals into the micron size droplets), this is very unlikely because of the large difference in surface area of the monomer swollen micelles (5-20 nm) with respect to the monomer droplets (1-10 μm), which favors entry of the oligoradicals into micelles and hence micellar nucleation.

Once the particles are formed in emulsion polymerization, the polymer particles undergo substantial growth by polymerization. The monomer required for the polymerization is to be transported from the monomer droplets by diffusion through the aqueous phase. This represents, in many cases, a limitation of the emulsion polymerization technique because it is very difficult to incorporate very hydrophobic monomers into the polymer particles due to their limited or negligible diffusion through the aqueous phase.

The need of mass transport of monomer through the aqueous phase would be greatly reduced if all (or a large fraction) of the droplets are nucleated. The nucleation in monomer droplets can be enhanced if the droplet size is reduced and the surface area of the droplets is large as compared with that of the micelles and hence droplet nucleation prevails over the other nucleation mechanisms.

What is known as miniemulsion polymerization is basically an oil-in-water emulsion where the size of the monomer droplets has been considerably reduced (50-500 nm) by combining a suitable emulsifier and an efficient emulsification technique and stabilizing the resulting nanoemulsion (so-called miniemulsion in the field) against diffusional degradation. Under this condition, the surfactant is adsorbed on the large surface area of the monomer droplets and hence (ideally in a well formulated miniemulsion) the available surfactant to form micelles is negligible and micelles are not present in the dispersion.

Therefore, if a water-soluble initiator is added to the system and oligoradicals are formed in the aqueous phase, they preferentially enter into monomer droplets that become polymer particles; namely, the main nucleation mechanism is droplet nucleation. The droplet nucleation is a unique feature of the miniemulsion polymerization, which allows the production of polymers that cannot be produced by any other polymerization technique.

If all the monomer droplets present in the original dispersion (monomer miniemulsion) capture radicals, all the droplets become polymer particles. This has been taken as an inherent feature of the miniemulsion polymerization, but it hardly takes place in practice; namely, in addition to droplet nucleation other nucleation mechanisms such as homogeneous and micellar nucleation might also take place as well as droplet coagulation and degradation.

A typical miniemulsion formulation includes water, monomer(s) and the surfactant and initiator systems. Typically, the procedure to prepare the miniemulsion is as follows: Once the surfactant system is dissolved in water, the water phase is mixed with the monomer(s) mixture under magnetic agitation. The resulting coarse emulsion is converted into a nanoemulsion by applying energy, generally from mechanical devices (rotor-stator systems, sonifiers and high-pressure homogenizers are the most common ones) or from the chemical potential of the components (low energy emulsification methods like phase inversion temperature).

Part B: Applications of Inventive Coating Systems

Coating Application on Metal Substrate for Anticorrosion Applications

Cleaning the steel substrate by degreasing in UNICLEAN 251 aqueous solution (100 g/l, 5 minutes at 60° C.) and acid etching in HCl solution 1 M (1 minute).

Alternatively, the steel substrate may be degreased in a fast-cleaning procedure using acetone and the drying with compressed air.

Rinsing with water and drying with compressed air.

Casting the latex on steel substrate in order to obtain a film with thicknesses of 30, 50 or 70 µm.

Drying the film for 24 hours, under controlled conditions.

Coatings made from Poly(MMA/BA) and Poly(POA/MMA/BA) latexes are dried at 23° C. and 60% humidity (to obtain high substrate phosphatization).

Coatings made from Poly(SA/MMA/BA) latex are dried at either 23° C. and 60% humidity (to obtain high substrate phosphatization) or at 60° C. (to obtain more homogeneous films).

Regarding the substrate cleaning, the details for cleaning are as follows:

Uniclean Procedure

Cleaning the steel substrate by degreasing in UNICLEAN 251 aqueous solution (100 g/l, 5 minutes at 60° C.) and acid etching in HCl solution 1 M (1 minute). Rinsing with water and drying with compressed air.

Casting the latex on steel substrate in order to obtain films of 30, 50 or 70 µm thickness.

Drying the film for 24 hours under controlled conditions.

Coatings made from poly(MMA/BA) and poly(POA/MMA/BA) latexes are dried at 23° C. and 60% humidity (to obtain high substrate phosphatization).

Coatings made from Poly(SA/MMA/BA) latex are dried at either 23° C. and 60% humidity (to obtain high substrate phosphatization) or at 60° C. (to obtain more homogeneous films).

Acetone Cleaning (Fast Cleaning Procedure)

Cleaning the steel substrate by degreasing in acetone and drying with compressed air.

Evaluation of Application Data

Regarding the different techniques used to evaluate the application data discussed subsequently, the details are as follows:

Electrochemical Impedance Spectroscopy (EIS) (Binders)

Electrochemical Impedance Spectroscopy (EIS) measurements were performed using a multichannel potentiostat BIO-LOGIC VMP3 to evaluate the corrosion behavior of the protection systems. A typical three electrodes cell was used, with a saturated Ag/AgCl (saturated with KCl) as reference electrode, platinum mesh counter electrode and the different coatings (cast for the synthetized latex) as working electrode. Electrochemical experiments were carried out at least by triplicate using an area of 1 cm². The electrochemical tests were conducted in 3.5 wt. % NaCl solution at room temperature. OCP was measured continuously with time although it was interrupted to carry out EIS measurements (once per hour). Frequency scans were carried out by applying ±10 mV sinusoidal wave perturbation versus OCP. The frequency range was from 1 MHz to 10 MHz, obtaining 10 points per decade.

All figures show the "Bode diagram" (impedance modulus (|Z|) vs. log frequency) of the different systems after exposure in 3.5 wt. % NaCl solution at room temperature. In order to compare the corrosion protection, a well-known criterion is to compare the impedance modulus at low frequency, i.e. $10^{-2}$ Hz: higher impedance usually indicates better corrosion protection. In general, optimal barrier protection is obtained if the impedance modulus is around $10^9$-$10^{10}$ $\Omega cm^2$. In contrast, absence of protection in a bare metal like steel provides lower impedance values at low frequency: $\approx 10^3$ $\Omega cm^2$. Therefore, if the coating starts to fail or is not providing an optimum barrier protection, the impedance value at low frequency ($10^{-2}$ Hz) will go from $10^8$ $\Omega cm^2$ to lower values.

Salt Spray Test (Binders)

Salt spray test was performed according to the ASTM B117-03. In this test, a coated panel is placed in a salt spray cabinet where it is subjected to a continuous salty fog of 5 wt. % sodium chloride solution at 35° C. The panels are placed at 15 degree angle from the vertical. Panels corrosion is evaluated after 24 h, 150 h, 400 h and every 200 h till the occurrence of mechanical failure of the specimens.

Regarding the interpretation of the application data results given hereinbelow, the details are as follows:

Drying Conditions and Chemical Composition of the Surfactant

FIG. 1. Impedance diagram shows a good behavior ($10^9$-$10^{10}$ $\Omega cm^2$) for all systems independently of the drying conditions and chemical composition of the surfactant. However, the main difference is observed due to the presence of flash rust in the interface of MB_D and the presence of a phosphatization in the interface of MB_S1 sample.

Exposure to Salt Spray Chamber

Figure 2:
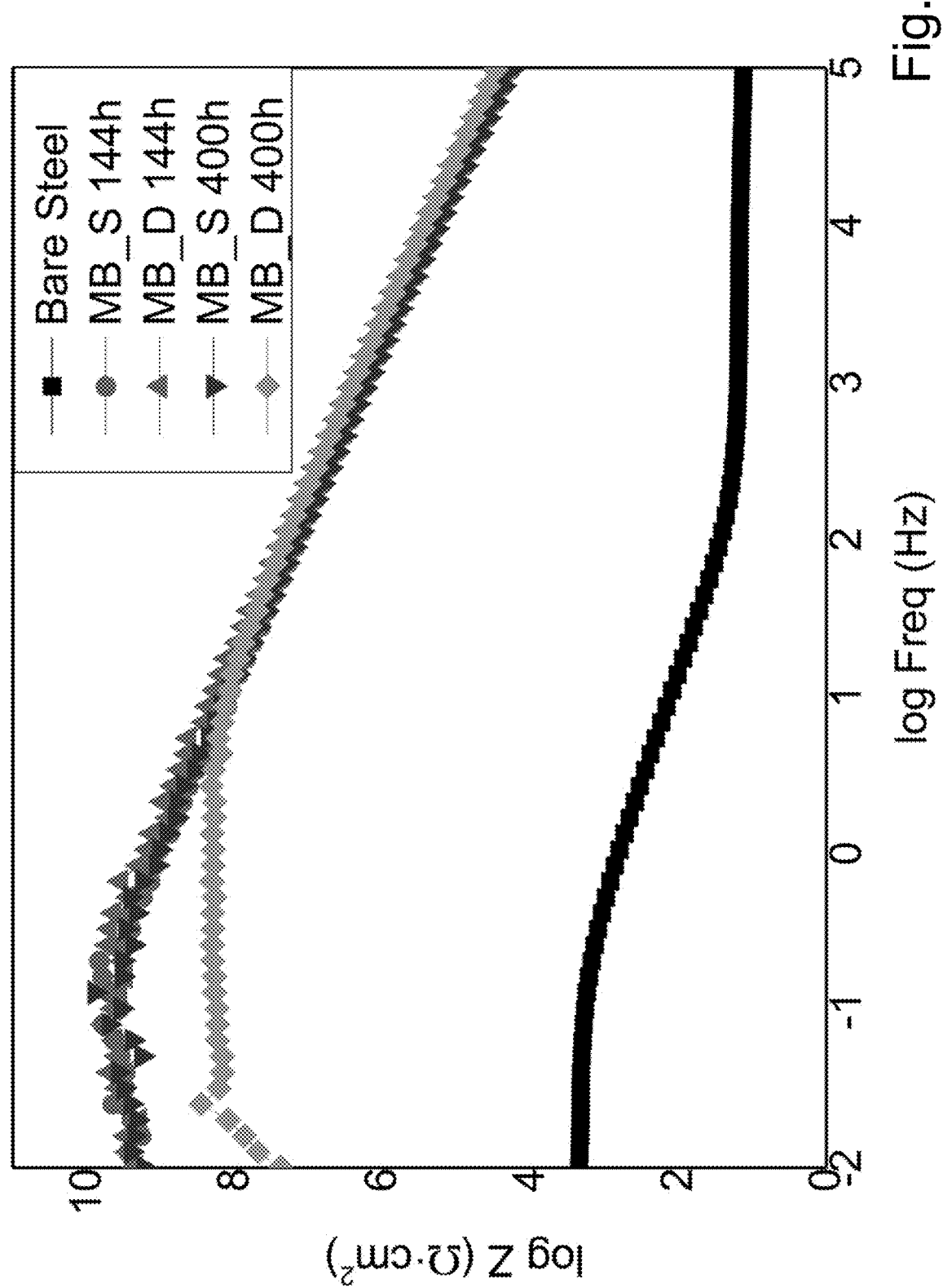
FIG. 2 provides an Impedance diagram for coated and a bare steel samples where samples are exposed to salt spray test following the standard ASTM B117-03 to accelerate the degradation.

FIG. 2. Samples are exposed to salt spray test following the standard ASTM B117-03 to accelerate the degradation. Two coatings under the same drying conditions (23° C. and 60% relative humidity) but with different surfactant in the synthesis process are compared through impedance measurements at different time of exposure:

144 hours: Both show similar barrier properties $10^{10}$ $\Omega cm^2$ 400 hours: There is a drop of impedance for MB_D2 specimen to $10^8 10$ $\Omega cm^2$, indicating the premature failure of the coating due to the interface.

Drying Conditions and Thickness

Figure 3:
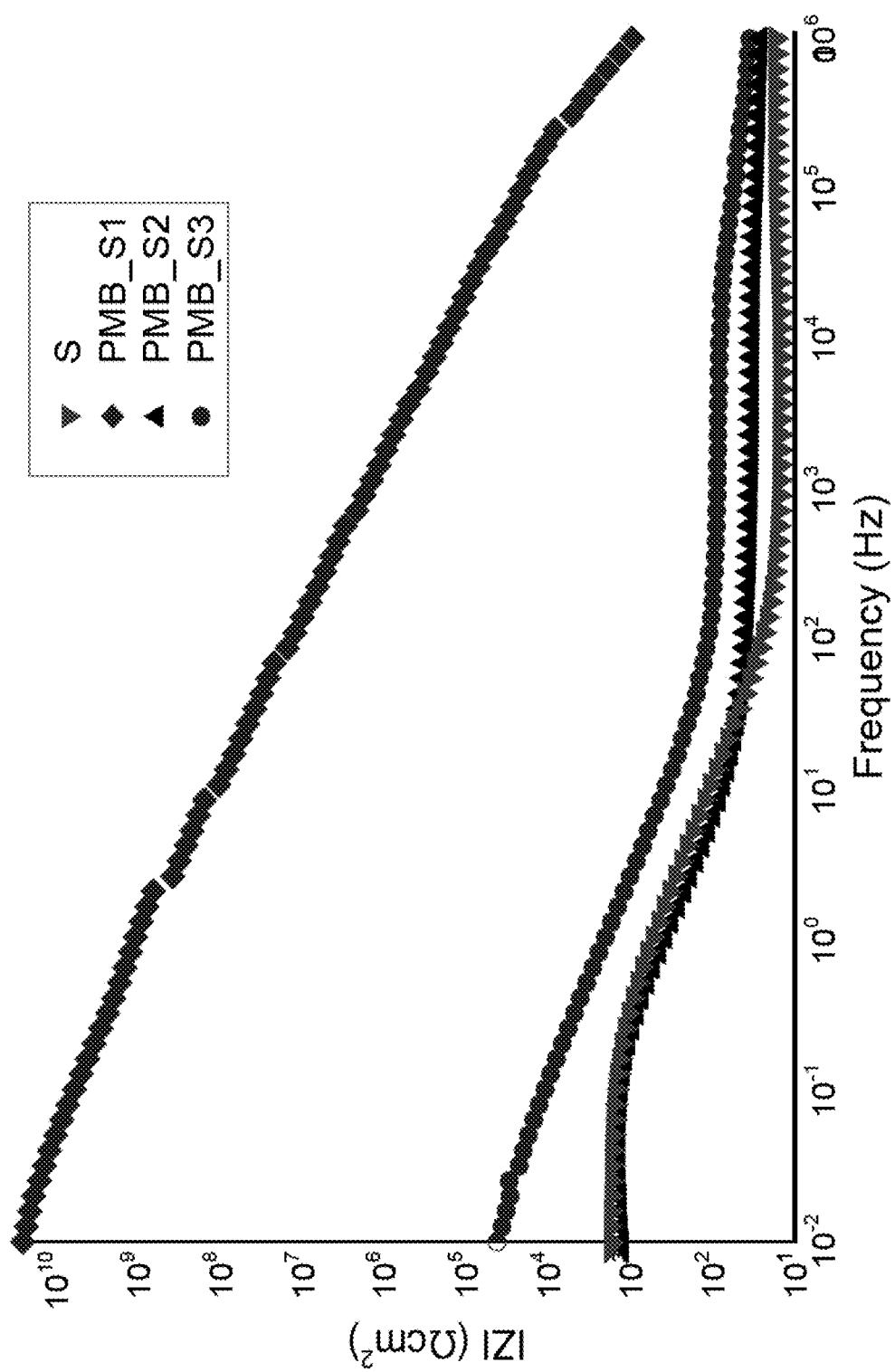
FIG. 3 provides an Impedance diagram for coated samples illustrating a good behavior ($10^9$-$10^{10}$ $\Omega cm^2$) only for PMB_S1 where phosphatization occurs.

FIG. 3. Impedance diagram shows a good behavior ($10^9$-$10^{10}$ $\Omega cm^2$) only for PMB_S1 where phosphatization occurs. However, independently of the thickness, if phosphatization does not occur, the impedance values are quite low: $10^5$ $\Omega cm^2$ for 90 µm thickness and $10^3$ $\Omega cm^2$ for 30 µm thickness.

Artificial Defects

An artificial defect has been done in a controlled way (Laser beam) with the aim to reach the metal/coating interface.

Figure 4:
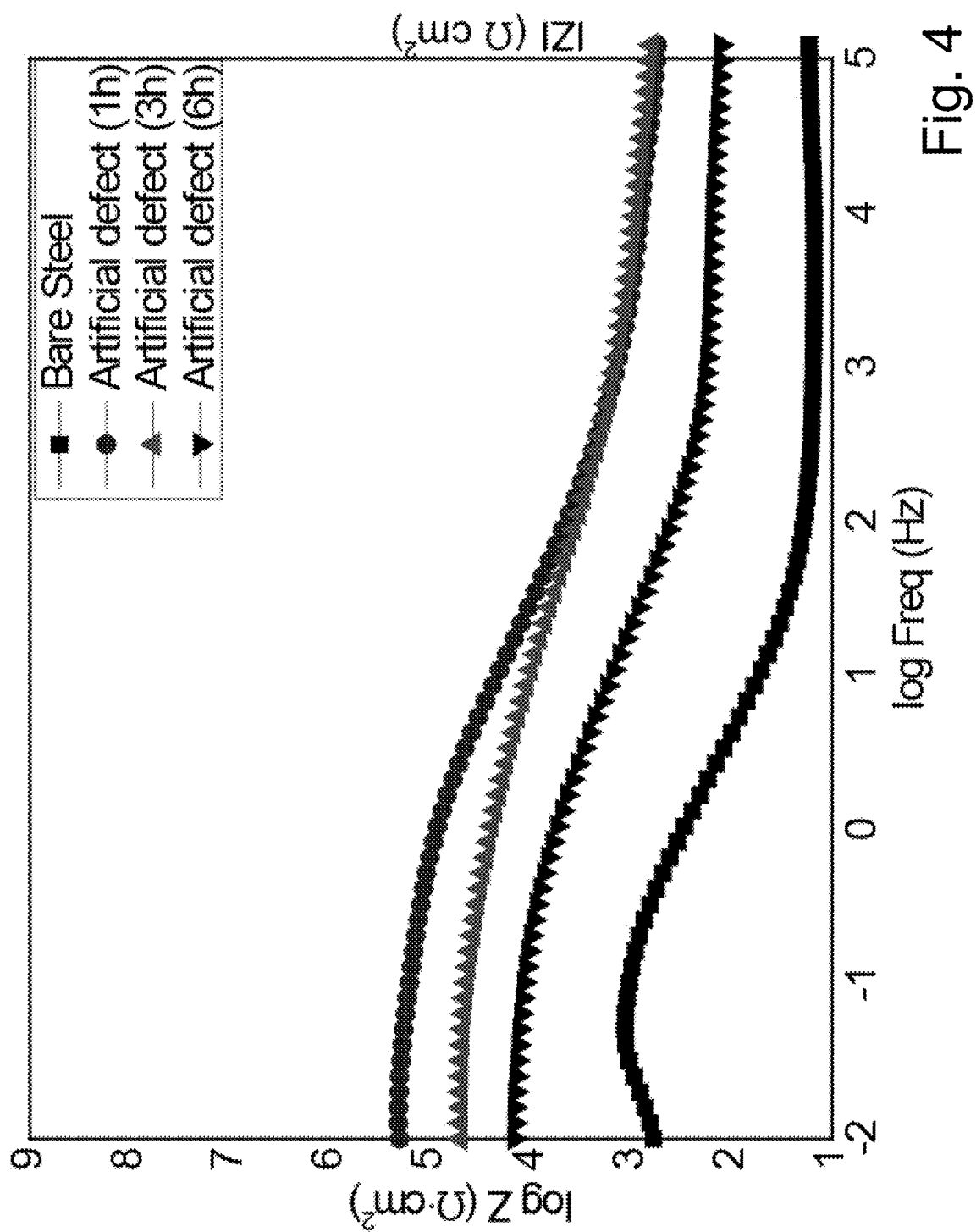
FIG. 4 provides an Impedance diagram for coated and bare steel samples for systems having a surface defect.

FIG. 4. Once a defect is present in the system, the barrier properties of the coating disappear and after 1 hour of exposure the electrolyte is able to reach easily the metal/coating interface providing an impedance value$\approx 10^5$ $\Omega cm^2$ that keeps decreasing with the exposure time (6 hours) at values$\approx 10^4$ $\Omega cm^2$.

Figure 5:
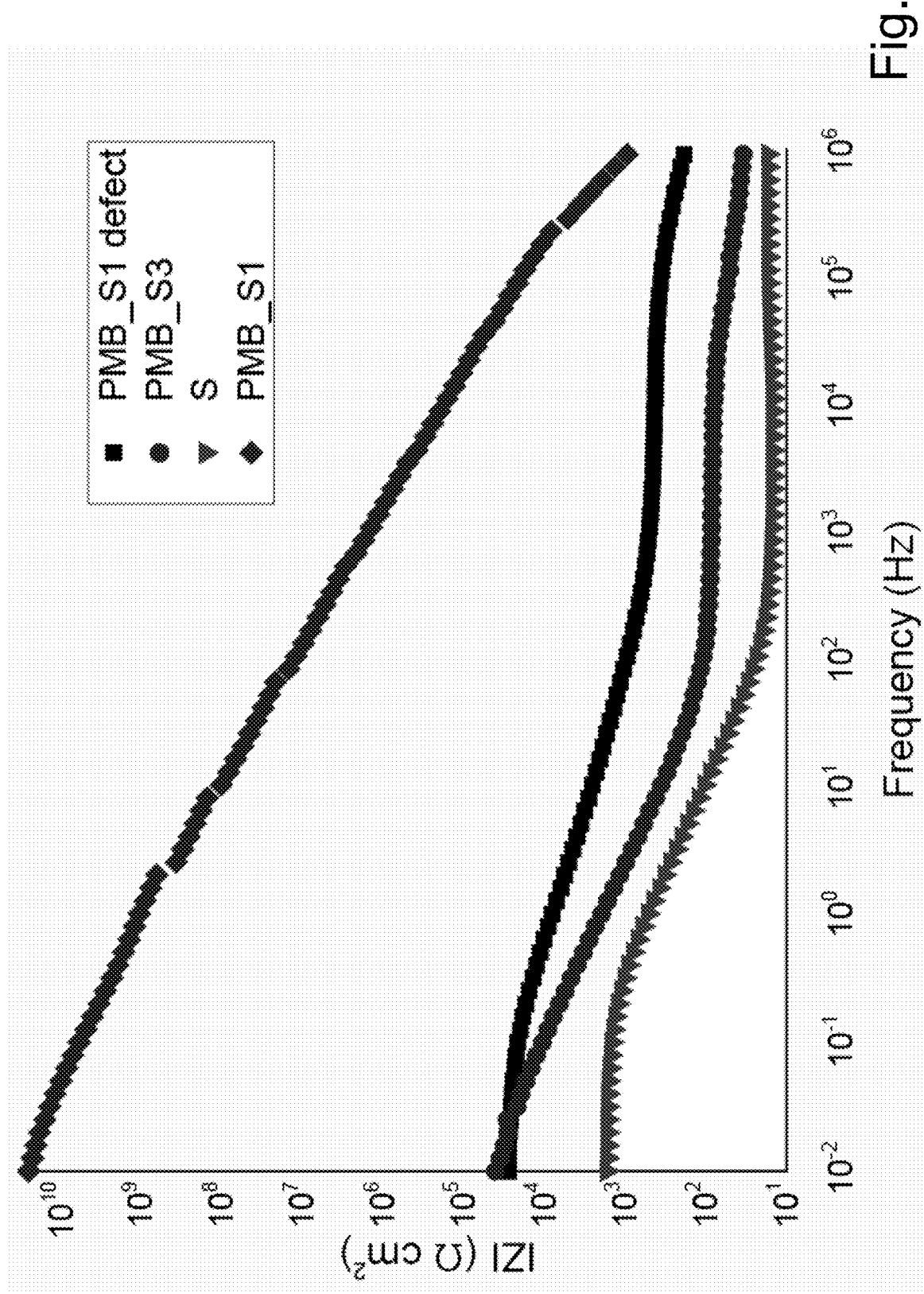
FIG. 5 provides an Impedance diagram for coated samples illustrating the positive effect of the phosphatization process.

FIG. 5. Impedance diagram reveals that the protection of PMB_S1 (with phosphatization) plus defect after 6 hours of exposure in 3.5 wt. % NaCl is similar compared to the PMB_S3 (without phosphatization), indicating the positive effect of the phosphatization process.

Crystallinity

Figure 6:
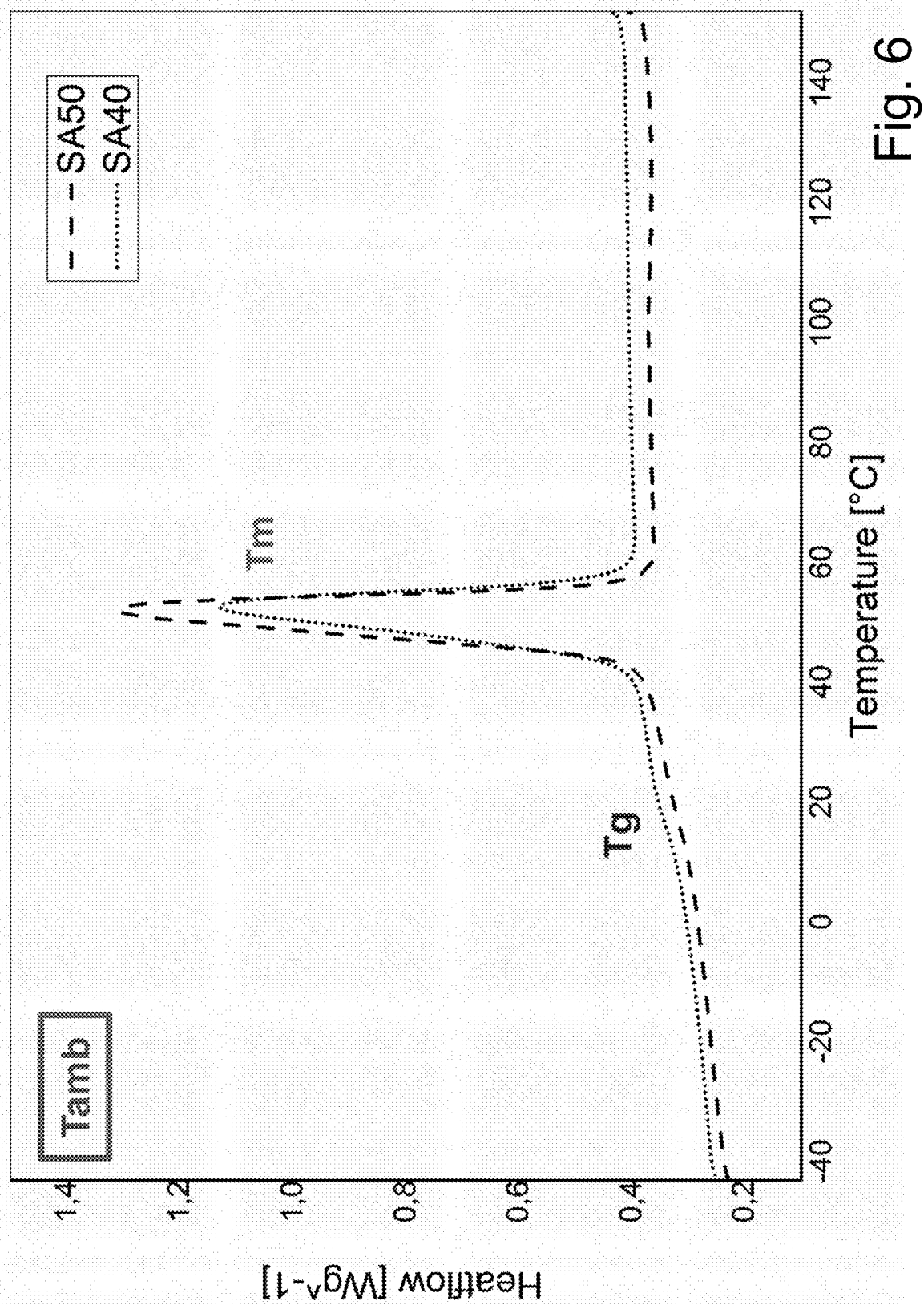
FIG. 6 provides a second run DSC scan for SA40_T60 1D and SA50_T60 1D.

FIG. 6. Second run DSC scan for SA40_T60 1D and SA50_T60 1D. DSC races presented the endothermic peak at $(50\pm 1)°$ C. corresponding to the crystalline polystearylacrylate domains and a second order transition that corresponds to the amorphous poly(MMA-co-BA) phase at $(15\pm 2)°$ C.

Water Sensitivity

Figure 7:
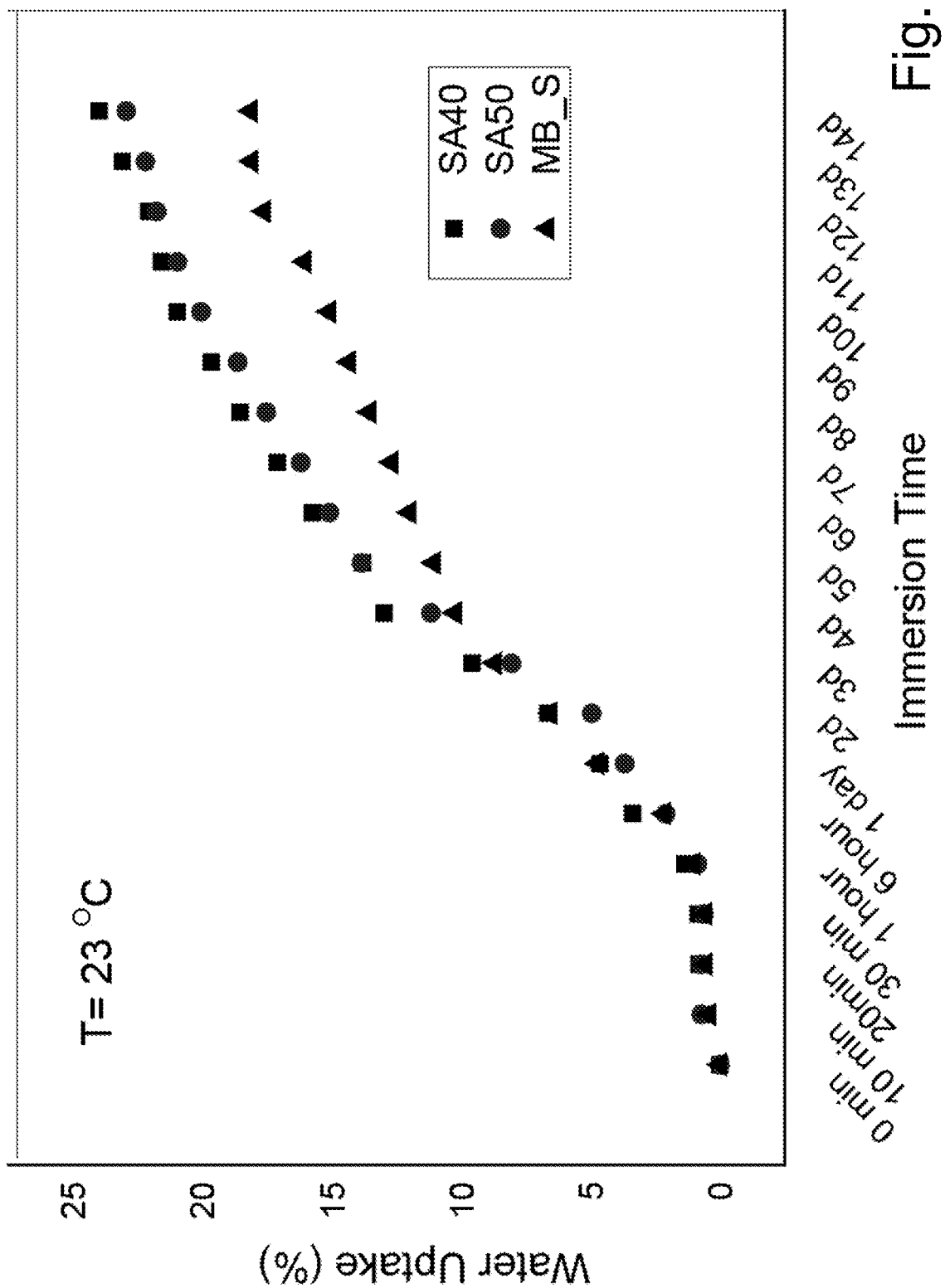
FIG. 7 provides water uptake measurements carried out by immersing films dried at room temperature in distilled water.

FIG. 7. Water uptake measurements carried out immersing films dried at room temperature in distilled water and following the weight gain along time. The water uptake in SA films dried at ambient temperature (SA40 and SA50) resulted higher than in MB_S film.

Figure 8:
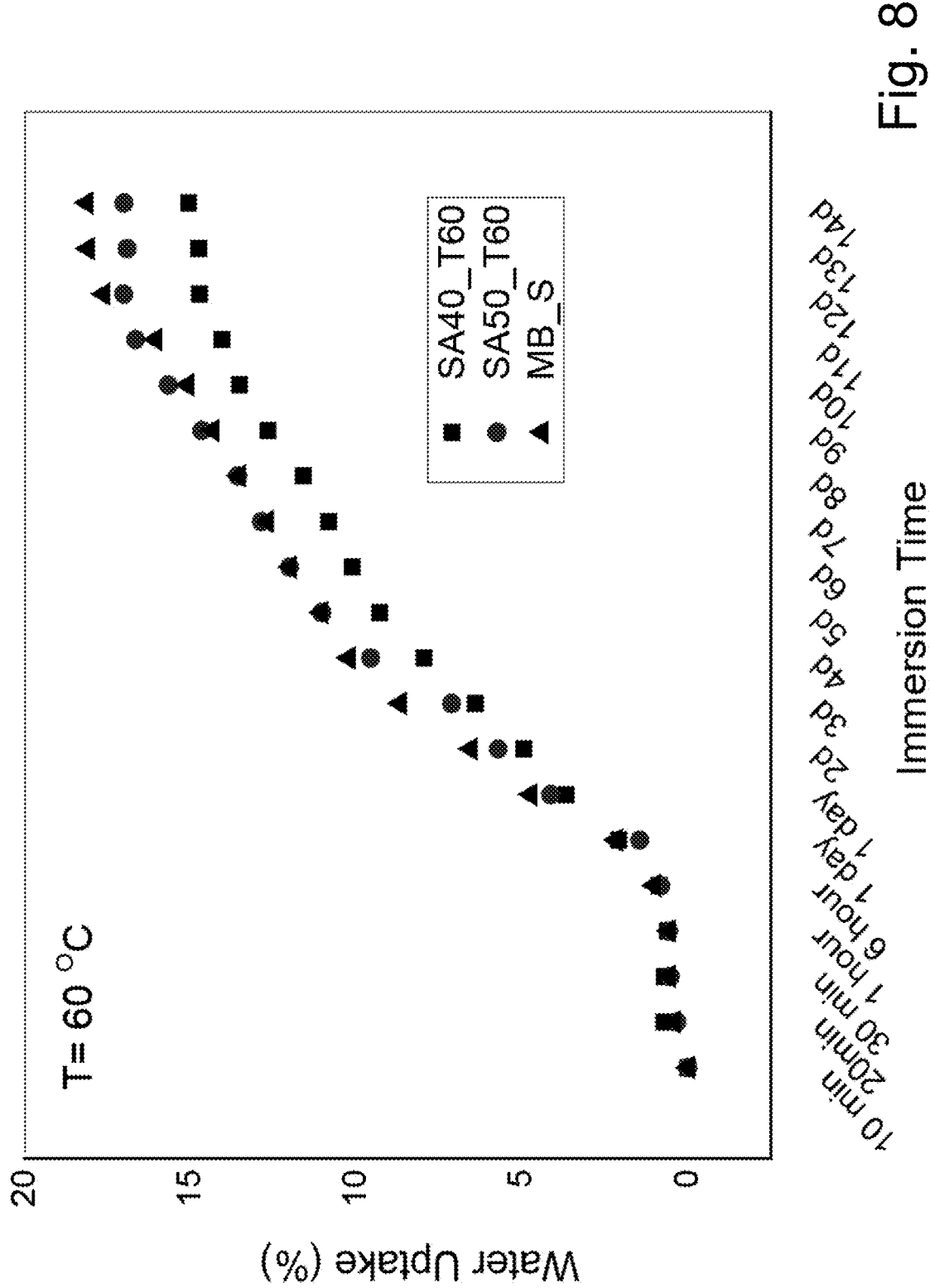
FIG. 8 provides water uptake measurements carried out by immersing films dried at 60° C. in distilled water and following the weight gain with time.

FIG. 8. Water uptake measurements carried out immersing films dried at 60° C. in distilled water and following the weight gain along time. The water uptake in SA films dried at 60° C. was substantially reduced with respect to SA films cast at ambient temperature and it was also reduced with respect to the water uptake of the film cast from MB_S latex.

Figure 9:
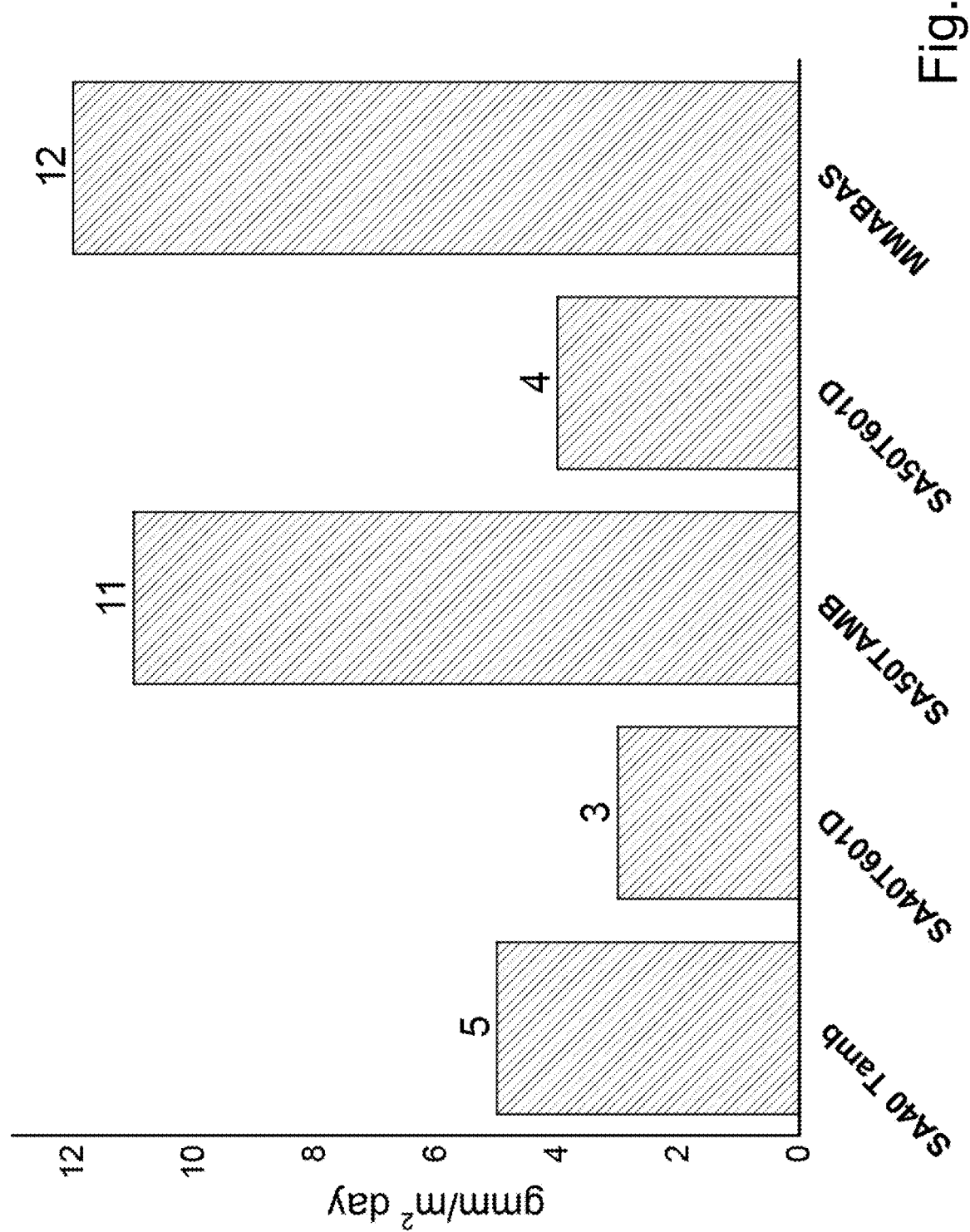
FIG. 9 provides water vapor transmission rate (WVRT) (g mm/m$^2$ day) of the films dried under different conditions.

FIG. 9. Water vapor transmission rate (WVRT) (g mm/m$^2$ day) of the films dried at different conditions. All the films containing semicrystalline nanodomains showed lower permeability to water vapor than the fully amorphous film cast from MB_S latex. The drying at 60° C. of the SA films reduced even more the WVTR of such films.

Drying Conditions with a Crystalline Phase

Figure 10:
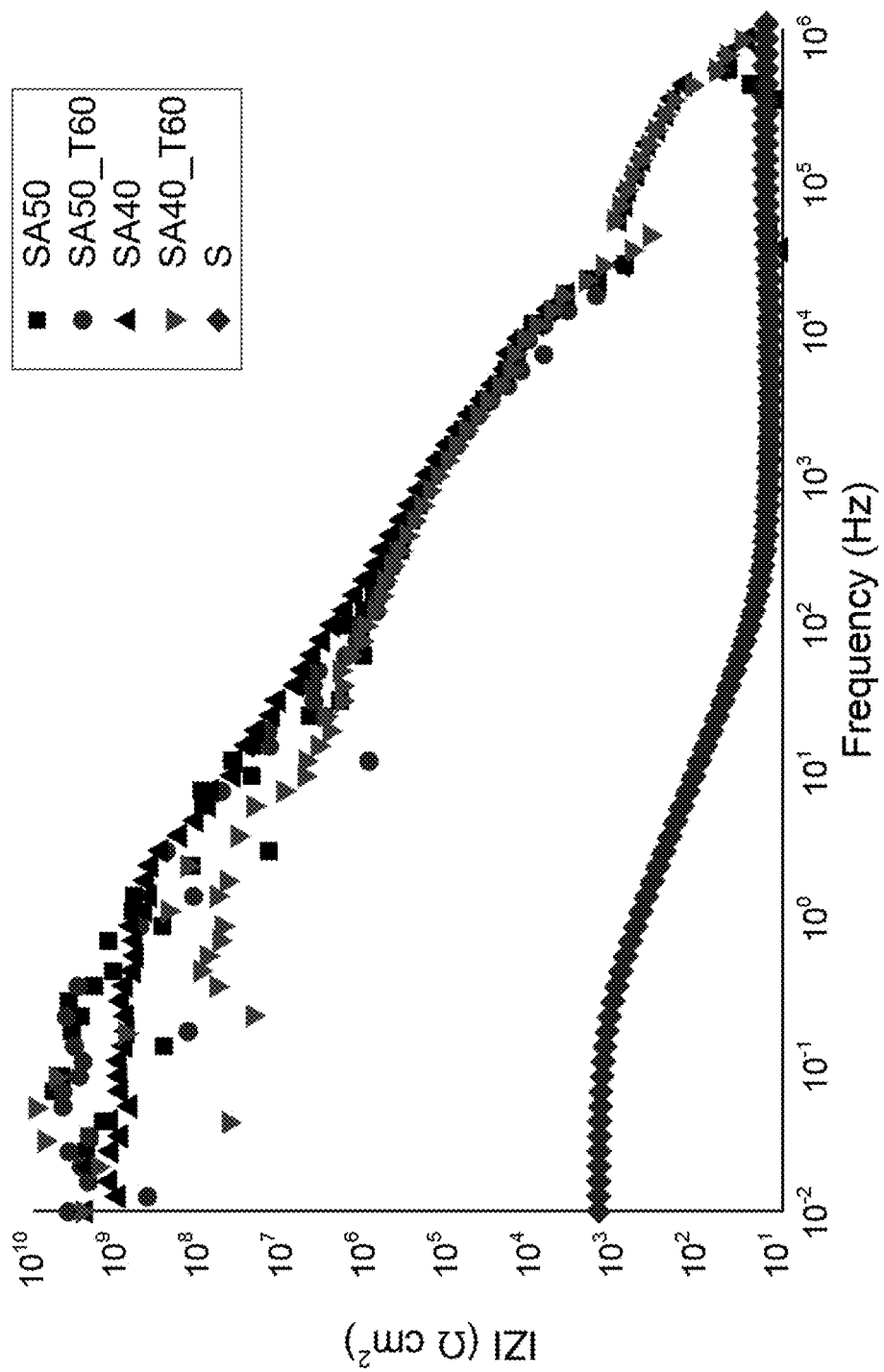
FIG. 10 provides an Impedance diagram revealing that independently from the phosphatization of the interface, the presence of a crystalline phase provides good corrosion protection ($10^9$-$10^{10}$ $\Omega cm^2$).

FIG. 10. Impedance diagram reveals that independently from the phosphatization of the interface, the presence of a crystalline phase provides good corrosion protection ($10^9$-$10^{10}$ $\Omega cm^2$).

Salt Spray Test

Figure 11:
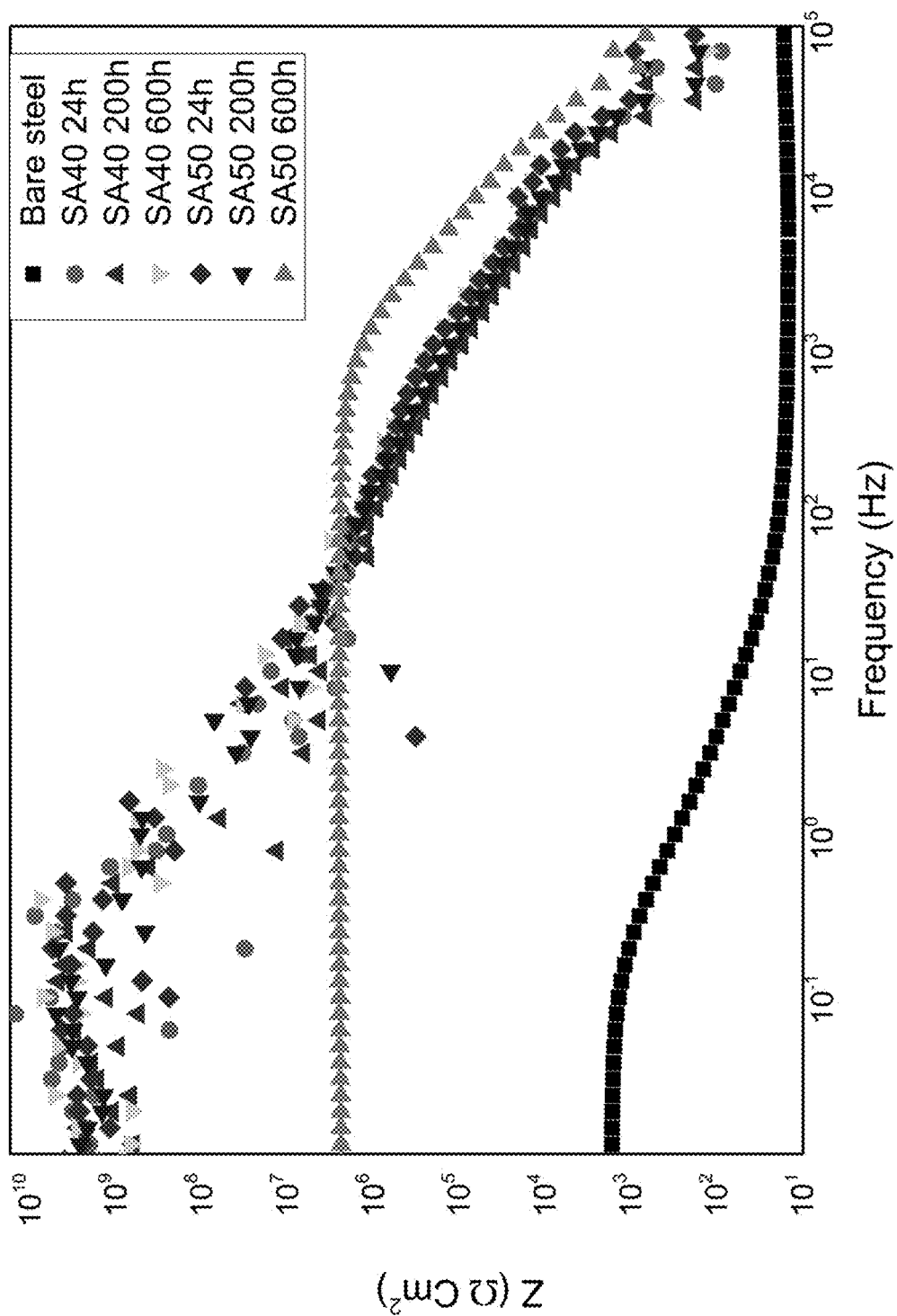
FIG. 11 provides Impedance measurements of samples exposed to a salt spray test following the standard ASTM B117-03 to accelerate the degradation.

FIG. 11. Samples are exposed to salt spray test following the standard ASTM B117-03 to accelerate the degradation. Two coatings under the same drying conditions (60° C.) but with different SA content are compared through impedance measurements at different times of exposure:

24 hours and 200 hours: Both coatings show similar barrier properties with impedance values around $10^{10}$ $\Omega cm^2$.

600 hours: There is a drop of impedance for SA50 specimen to $10^6$ $\Omega cm^2$, indicating the premature failure of the coating, while SA40 still presents high performance.

Part C: Synthesis and Applications of Inventive Coating Systems

Polymerization by Seeded Semibatch Emulsion Polymerization Poly(MMA/BA) with Phosphated Surfmer

| LATEX | MB(seed) | MMA g | BA g | KPS g | Dowfax 2A1 g | Sipomer PAM-200 g | Water g |
|---|---|---|---|---|---|---|---|
| MB seed | — | 31.3 | 31.3 | 0.313 | 0.63 | | 436.7 |
| MB_S | 107 | 119 | 119 | 0.313 | / | 5 | 149.77 |
| MB_D | 107 | 119 | 119 | 0.313 | 5 | / | 149.77 |

Seed Synthesis (First Stage)
SC=13% (SC=Solids Content)
T=70° C.
Dp=65 nm (Dp=Diameter of particles)

Latex Synthesis (Second Stage)
SC=50%
Dp=180 nm
T=70° C.
1 h heating at 70° C.
Poly(MMA/BA) with Phosphated Surfmer
Overall Surfactant (Wmb %)

| | DOW seed | DOW feed | SIP seed | SIP feed | Seed particles size (nm) | Final particles size (nm) |
|---|---|---|---|---|---|---|
| MB_S | 0.11 | — | — | 2 | 65 | 189 |
| MB_D | 0.11 | 2 | — | — | 65 | 187 |

Anticorrosion Applications—MB Series

Drying Conditions
T=23° C.
H=60%

Anticorrosion Applications—MB Series

Electrochemical Impedance Spectroscopy

| | | | Drying conditions | | | | |
|---|---|---|---|---|---|---|---|
| Latex | Specimen tag | Average thickness (μm) | Temperature (° C.) | Relative humidity (H %) | Phosphatization | Flash rust | IZI (Ω cm$^2$) |
| MB_S | MB_S1 | 30 | 23 | 60 | yes | no | $10^9$-$10^{10}$ |
| | MB_S2 | 30 | 23 | <60 | no | no | $10^9$-$10^{10}$ |
| | MB_S3 | 90 | 23 | <60 | no | no | $10^9$-$10^{10}$ |
| MB_D | MB_D1 | 30 | 23 | 60 | no | yes | $10^9$-$10^{10}$ |
| Bare steel | S | — | — | — | — | — | $10^3$ |

500 h; NaCl 3.5% solution; T = 23° C.

The obtained results are illustrated in FIG. 1 (FIG. 1).

FIG. 1: Impedance diagram shows a good behavior ($10^9$-$10^{10}$ $\Omega cm^2$) for all systems independently of the drying conditions and chemical composition of the surfactant. However, the main difference is observed due to the presence of flash rust in the interface of MB_D and the presence of a phosphatization in the interface of MB_S1 sample.

Anticorrosion Applications—Mb

ASTM B117-03
T=(35±1)° C.
NaCl 5%

Anticorrosion Applications—MB Salt Spray

| | | Drying conditions | | |
|---|---|---|---|---|
| Specimen tag | Film thickness (μm) | Temperature (° C.) | Relative humidity (H %) | IZI (Ω cm$^2$) * |
| | | | | 144 h   408 h |
| MB_S4 | 58 | 23 | 60 | $10^{10}$   $10^{10}$ |
| MB_D2 | 60 | 23 | 60 | $10^{10}$   $10^8$ |

The obtained results are illustrated in FIG. 2 (FIG. 2).

FIG. 2: Samples are exposed to salt spray test following the standard ASTM B117-03 to accelerate the degradation. Two coatings under the same drying conditions (23° C. and 60% relative humidity) but with different surfactant in the synthesis process are compared through impedance measurements at different time of exposure:
  144 hours: Both show similar barrier properties $10^{10}$ $\Omega cm^2$
  400 hours: There is a drop of impedance for MB_D2 specimen to $10^8$ $\Omega cm^2$, indicating the premature failure of the coating due to the interface.

Anticorrosion Applications—MB—Conclusions
  Poly(MMA/BA) waterborne binder resists against corrosion under mild conditions (500 hour immersion in NaCl 3.5% wt. solution).
  Substrate phosphatization occurs when the binder is dried at low drying rate (T=23° C., H=60%).
  Substrate phosphatization layer is fundamental for corrosion protection under harsh conditions (T=(35±1) ° C. NaCl 5%).

Poly(POA/MMA/BA) with Phosphated Surfmer
Perfluorooctyl Acrylate (POA)
Polymerization by Seeded Semibatch Emulsion Polymerization
Poly(POA/MMA/BA) with Phosphated Surfmer
  POA/MMA/BA=30/40/30
  Sipomer=2% wmb
  SC=50%

|  |  | Miniemulsion (g) | | Preemulsion feed (g) |
|---|---|---|---|---|
|  |  | Latex seed | | PMB_S |
| Oil phase | POA | 74.95 | | — |
|  | MMA | 9.86 | | 90.07 |
|  | BA | 9.86 | | 65.09 |
|  | AIBN | 0.95 | | — |
| Aqueous phase | Water | 220.92 | | 28.93 |
|  | DOW | 1.89 | | — |
|  | SIP | — | | 5 |

INITIAL SOLIDS CONTENT OF THE SEED 30%

Poly(POA/MMA/BA) with Phosphated Surfmer

| Latex | Seed particles size (nm) T = 30 min | Latex particles size (nm) T = 240 min | Theoretical particles size (nm)* |
|---|---|---|---|
| PMB_S | 348 | 506 | 509 |

Anticorrosion Applications—PMB_S

| | Drying conditions | | | | |
|---|---|---|---|---|---|
| Specimen tag | Average thickness (μm) | Temperature (° C.) | Relative humidity (H %) | Phosphatization | Flash rust | IZI ($\Omega$ cm²) * |
| PMB_S1 | 30 | 23 | 60 | yes | no | $10^9$-$10^{10}$ |
| PMB_S2 | 30 | 23 | <60 | no | no | $10^3$ |
| PMB_S3 | 90 | 23 | <60 | no | no | $10^5$ |
| Bare steel (S) | — | — | — | — | — | $10^3$ |

500 h; NaCl 3.5% solution; T = 23° C.

The obtained results are illustrated in FIG. 3 (FIG. 3).

FIG. 3: Impedance diagram shows a good behavior ($10^9$-$10^{10}$ $\Omega cm^2$) only for PMB_S1 where phosphatization occurs. However, independently of the thickness, if phosphatization does not occur, the impedance values are quite low: $10^5$ $\Omega cm^2$ for 90 μm thickness and $10^3$ $\Omega cm^2$ for 30 μm thickness.

Anticorrosion Applications—PMB_S
EIS Analysis after Superficial Defect
  NaCl 3.5 wt. % solution
  The obtained results are illustrated in FIGS. 4 and 5 (FIGS. 4 and 5).
Artificial Defects
  An artificial defect has been done in a controlled way (Laser beam) with the aim to reach the metal/coating interface.
  FIG. 4: Once a defect is present in the system, the barrier properties of the coating disappear and after 1 hour of exposure the electrolyte is able to reach easily the metal/coating interface providing an impedance value≈$10^5$ $\Omega cm^2$ that keeps decreasing with the exposure time (6 hours) at values≈$10^4$ $\Omega cm^2$.
  FIG. 5: Impedance diagram reveals that the protection of PMB_S1 (with phosphatization) plus defect after 6 hours of exposure in 3.5 wt. % NaCl is similar compared to the PMB_S3 (without phosphatization), indicating the positive effect of the phosphatization process.

Anticorrosion Applications—PMB_S—Water Sensitivity

| | WU Weight gain % | WVTR Gmm/m² of H₂O by Day |
|---|---|---|
| MB S | 18 | 12 |
| PMB S | 7 | 63 |

Anticorrosion Applications—PMB_S—Resume
  Even though the introduction of POA in the binder formulation, an affected film formation might slightly affect the barrier properties.
  Synergic effect of phosphatization and hydrophobicity of the coating allow to prevent corrosion under mild conditions (NaCl 3.5%).
  Phosphatization is not always sufficient to prevent corrosion under harsh conditions but always under standard conditions.

Waterborne Semi-Crystalline Polymer Coating
Stearyl Acrylate SA
  SA Miniemulsion polymerization
  SA seed
  SC=30%

Feeding
MMA/BA+SIPOMER PAM 200
SC=45%
SA40=SA/MMA/BA=40/30/30; SA50=SA/MMMA/BA=50/25/25
Poly(SA/MMA/BA) with Phosphated Surfmer
Seeded semibatch emulsion polymerization

|  | SA40 | | SA50 | |
|---|---|---|---|---|
| LATEX | initial charge (g) | stream (g) | initial charge (g) | stream (g) |
| SA | 31.5 | — | 38.25 | — |
| MMA | — | 23.6 | — | 19.12 |
| BA | — | 23.6 | — | 19.12 |
| Water | 82.12 | 7 | 84.15 | 9.35 |
| DOW | 0.63 | — | 0.765 | — |
| SIP | — | 1.575 | — | 1.53 |
| KPS | — | 0.236 | — | 0.19 |
| AIBN | 0.16 | — | 0.19 | — |

SA Seed
  SC=30%
  T=70° C.
  3 h
Final Latex
  SC=45%
  T=70° C.
  3 h
Poly(SA/MMA/BA) with Phosphated Surfmer

| latex | Droplet size (nm) | Seed particles size (nm) | Final particles size (nm) |
|---|---|---|---|
| SA40 | 199 | 187 | 176 |
| SA50 | 167 | 173 | 173 |

Poly(SA/MMA/BA) with Phosphated Surfmer
Drying Conditions
  T=23° C.
  H=60%
Theoretical Crystallinity
  SA40=16.6%
  SA50=20.2%

| | | First Heating | | | |
|---|---|---|---|---|---|
| | | $\Delta H_f$ (J/g) | XC (%) | Tm (° C.) | Tg (° C.) |
| SA40 | Tamb | 34.5 | 15.7 | 49.0 | 14.8 |
| | Tamb/T60 1D | 34.9 | 15.9 | 48.6 | 15.0 |
| | T60 1D | 35.6 | 16.2 | 49.6 | 13.8 |
| SA50 | Tamb | 43.5 | 19.8 | 50.3 | 16.3 |
| | Tamb/T60 1D | 41.7 | 19.0 | 49.9 | 16.8 |
| | T60 1D | 42.0 | 19.1 | 49.9 | 17.3 |

The obtained results are illustrated in Figure (FIG. 6).

FIG. 6: Second run DSC scan for SA40_T60 1D and SA50_T60 1D. DSC races presented the endothermic peak at $(50\pm1)°$ C. corresponding to the crystalline polystearylacrylate domains and a second order transition that corresponds to the amorphous poly(MMA-co-BA) phase at $(15\pm2)°$ C.

Poly(SA/MMA/BA) with Phosphated Surfmer PAM-200: Water Sensitivity

The obtained results are illustrated in FIGS. 7 to 9 (FIGS. 7 to 9).

FIG. 7: Water uptake measurements carried out immersing films dried at room temperature in distilled water and following the weight gain along time. The water uptake in SA films dried at ambient temperature (SA40 and SA50) resulted higher than in MB_S film.

FIG. 8: Water uptake measurements carried out immersing films dried at 60° C. in distilled water and following the weight gain along time. The water uptake in SA films dried at 60° C. was substantially reduced with respect to SA films cast at ambient temperature and it was also reduced with respect to the water uptake of the film cast from MB_S latex.

FIG. 9: Water vapor transmission rate (WVRT) (g mm/m² day) of the films dried at different conditions. All the films containing semicrystalline nanodomains showed lower permeability to water vapor than the fully amorphous film cast from MB_S latex. The drying at 60° C. of the SA films reduced even more the WVTR of such films.

Poly(SA/MMA/BA) with Phosphated Surfmer—Anticorrosion

| | | | Drying conditions | | | | |
|---|---|---|---|---|---|---|---|
| Latex | Specimen tag | Average thickness (μm) | Temperature (° C.) | Relative humidity (H %) | Phosphatization | Flash rust | IZI ($\Omega$ cm²) * |
| SA40 | SA40 | | 23 | 60 | yes | no | $10^9$-$10^{10}$ |
| | SA40-T60 | | 60 | NA | no | no | $10^9$-$10^{10}$ |
| SA50 | SA50 | | 23 | 60 | yes | no | $10^9$-$10^{10}$ |
| | SA50-T60 | | 60 | NA | no | no | $10^9$-$10^{10}$ |
| Bare steel | S | — | — | — | — | — | $10^3$ |

500 h; NaCl 3.5% solution; T = 23° C.

The obtained results are illustrated in FIG. 10 (FIG. 10).

FIG. 10: Impedance diagram reveals that independently from the phosphatization of the interface, the presence of a crystalline phase provides good corrosion protection ($10^9$-$10^{10}$ $\Omega cm^2$).

Anticorrosion Applications—Poly(SA/MMA/BA) with Phosphated Surfmer

Salt Spray

The obtained results are illustrated in FIG. 11 (FIG. 11).

FIG. 11: Samples are exposed to salt spray test following the standard ASTM B117-03 to accelerate the degradation. Two coatings under the same drying conditions (60° C.) but with different SA content are compared through impedance measurements at different times of exposure:

- 24 hours and 200 hours: Both coatings show similar barrier properties with impedance values around $10^{10}$ $\Omega cm^2$.
- 600 hours: There is a drop of impedance for SA50 specimen to $10^6$ $\Omega cm^2$, indicating the premature failure of the coating, while SA40 still presents high performance.

Anticorrosion Application—SA

Homogeneous dispersion of crystalline domains inside the polymer matrix is obtained by the synthesis of core/shell-structured semicrystalline polymers by introducing SA in the formulations.

The presence of crystalline domains reduce the permeations and the absorption of $H_2O$ through the coating.

| Excellent anticorrosive properties are obtained.PAINT FORMULATIONS-FORMULATION template | | MB, SA40, SA50 | |
|---|---|---|---|
| function | component | Composition % | weight (g) |
| solvent | Water | 28.7 | 85.8 |
| dispersant | Dispex AA 4140 | 0.4 | 1.2 |
| binder | Polymer | 5.0 | 15.0 |
| pigment | TiO₂ tipy R706 | 15.0 | 45.0 |
| filler | Talc CHB2 (ex Sartal 5B) | 5.0 | 15.0 |
| coalescent | butyl glycol | 2.0 | 6.0 |
| binder | Polymer | 42.0 | 126.0 |
| antifoaming | Tego foamex 810 | 0.3 | 0.9 |
| base | Ammonia 25% | 0.3 | 0.9 |
| wetting agent | Tego glider 410 | 0.3 | 1.2 |
| thickener | Tafigel pur44 | 1.0 | 3.0 |
| | | 100.0 | 300.0 |

50 μm thick coat over a Q-pannel smooth finish.
MB paint dried at 23° C. and 60 RH %
SA paints dried at 60° C.
No signs of flash rust and good film formation
High humidity corrosion test (40° C. and 99 RH %) started with visual control after 72 h and 250 hours Paint Formulations—High Humidity Corrosion Test
T=40° C., H=99%, 250 h
70 μm coating thickness Paints without Inhibitors Successfully Pass 250 H of High Humidity Corrosion Test.

CONCLUSIONS

Good anticorrosion properties are obtained thanks to the substrate phosphatization by introducing phosphate surfmer into the latex composition.

Substrate phosphatization occurs when the coating is dried at low drying rates.

When latexes based on MMA/BA are used, the beneficial effect of substrate phosphatization is observed even when the specimen undergo harsh corrosive conditions.

Due to the decrease of coalescence, the barrier properties of coatings based on POA are slightly compromised.

The introduction of crystalline nanodomains in the polymer matrix by the incorporation of SA in the binder formulation enhances the barrier properties of the coating and its hydrophobicity.

Paints based on MMA/BA and SA/MMA/BA do not need additional inhibitors to provide good anticorrosion properties.

Part D: Further Experimental Data and General Evaluation and Conclusion

Abbreviations

MMA, Methyl methacrylate; BA, Butyl acrylate; KPS potassium persulfate; DOW, Dowfax 2A1; SIP, Sipomer PAM200; DLS dynamic light scattering; EIS, electrochemical impedance spectroscopy; SEM, scanning electrical microscopy; EDX energy dispersive X-ray spectroscopy; RH, relative humidity.

1. Experimental 1.1 Materials

Methyl methacrylate (MMA) and n-butyl acrylate (BA) (Quimidroga) are used as received. Dodecyl diphenyloxide disulfonate (Dowfax 2A1 45%, Dow Chemical company, DOW) is used as anionic emulsifier. Phosphate esters of polypropylene glycol monomethacrylate (Sipomer® PAM200, Solvay, SIP) are used as surfmer. Sipomer® PAM 200 is a surfmer characterized by a short polypropylene glycol chain (Mn=500 g/mol) with a polymerizable acrylic end group and a phosphate group as polar chain end. Potassium persulfate (KPS, Fluka) radical initiator is used as received. Deionized water (MiliQ quality) is used in all reactions. Steel substrates (medium carbon steel with 0.5% of C) are purchased from Urduri S.L. UniClean 251 (Atotech) is used as degreasing agent for the steel substrates. HCl 1 M solution (Aldrich) is used in the cleaning treatment of the steel substrates.

1.2 Synthesis of Phosphated Poly(MMA-Co-BA) Waterborne Dispersions

All the latexes are synthetized by seeded semibatch emulsion polymerization and the recipes are summarized in the below Tables. The synthesis of the seed (labeled MB) with a solids content of 13%, is carried out in a 1 L glass-jacketed reactor (equipped with reflux condenser, feeding and sampling outlet and stainless steel impeller rotating at 200 rpm) under a $N_2$ atmosphere at 70° C. in semibatch conditions by feeding the monomer during 4 hours and allowing the latex to react for one more hour under batch conditions. The seeded semibatch emulsion polymerization is carried out in the same glass-jacketed reactor. In detail, the experimental procedure to achieve a latex of 50% solids content is as follows: The seed is added into the reactor and heated up to the target reaction temperature of 70° C. Once the temperature is reached, the initiator (KPS) is added and a monomer preemulsion (containing the monomers, water and Sipomer PAM200 (SIP) or Dowfax 2A1 (DOW)) is fed to the reactor for 4 hours. A pH neutralization, by addition of ammonia solution, of the preemulsion containing SIP is necessary to incorporate the surfmer into the system as very acid or very basic conditions would hydrolyze the ester linkage of the phosphate group.

Upon finishing the feeding, the reaction is post-polymerized for one hour to reduce the amount of unreacted monomers. The latex synthetized with SIP is labeled as MB_S and the one with DOW as MB_D (see below Table).

TABLE

MB seed formulation

| Reagent | Initial load (g) | Stream (g) |
|---|---|---|
| MMA | — | 31.3 |
| BA | — | 31.3 |
| Water | 436.7 | — |
| DOW | 0.630 | — |
| KPS | 0.313 | — |
| NaHCO$_3$ | 1.035 | — |

TABLE

Formulation used to synthetize MB_S and MB_D waterborne binders

| LATEX | MB (seed)(g) | MMA(g) | BA(g) | KPS(g) | DOW(g) | SIP(g) | Water(g) | S.C.(%) |
|---|---|---|---|---|---|---|---|---|
| MB_S | 107 | 119 | 119 | 0.313 | — | 5 | 149.77 | 50 |
| MB_D | 107 | 119 | 119 | 0.313 | 5 | — | 149.77 | 50 |

1.3 Characterization Methods

Monomer conversion is determined by gravimetry. Polymer particle size distributions are measured by Dynamic Light Scattering (DLS) using a Zetasizer Nano Series (Malvern instrument). For this analysis, a fraction of latex is diluted with deionized water. The reported average particle size values represent a z-average of two repeated measurements. Regarding the latex films, different properties are investigated. The latexes are cast onto steel substrates and their anticorrosion properties are studied. Before casting the latex, steel substrates are degreased with UniClean 251 solution at 70° C. in a shaking bath for 5 minutes followed by 1 minutes decaping in HCl solution (1:1). Then the waterborne latexes are uniformly applied on the steel substrates obtaining thicknesses around 40 µm. The films are applied with quadruple film applicator (Khushbooscientific).

Latex drying tests on the steel substrates are carried out using a temperature and humidity chamber (ESPEC SH-641), maintaining the temperature at 23° C. and controlling the drying rate by changing the relative humidity (RH: 30, 43, 50, 60%).

Electrochemical tests are performed using a multichannel potentiostat BIO-LOGIC VMP3 to evaluate the corrosion behavior of the systems. A typical three electrodes cell, with a saturated Ag/AgCl (saturated with KCl) as reference electrode, platinum mesh counter electrode and the different coatings (cast from the synthetized latex) as working electrode are used. Electrochemical experiments are carried out at least by triplicate using an area of 1 cm$^2$. The electrochemical tests are conducted in 3.5 wt. % NaCl solution at room temperature. OCP is measured continuously with time although it is interrupted to carry out EIS measurements (once per hour). Frequency scans are carried out by applying ±10 mV sinusoidal wave perturbation versus OCR The frequency range is from 100 Hz to 10 mHz, obtaining 10 points per decade. Three specimens are used to perform neutral salt spray tests (NSS) for each system. Experiment are conducted using a DYCOMETAL MODEL SCC-400 salt spray chamber for 800 h. Test parameters are set according to ASTM B117 standard. Visual evaluation is carried out according to ISO 10289:1999 standard.

SEM with X-Ray diffraction (SEM-EDX) is used to visualize the morphology of the coatings and to analyze the interface between the coating and the substrate in terms of its chemical composition. The coating is detached from the steel surface by immersion in liquid nitrogen after being applied under different drying conditions. All the measurements are performed using a bench top SEM 3030 Hitachi operating at 15 kV and at low vacuum. Furthermore, the composition profile of the coating applied onto the steel substrate is obtained using a Quantax EDS Bruker.

2. Results and Discussion 2.1 Synthesis of Phosphated Poly(MMA-Co-BA) Waterborne Dispersions Stable poly(MMA-co-BA) seed latex with 13% of solids content and average particle size of 65 nm is successfully synthetized by semibatch emulsion polymerization and then used for the synthesis of the final waterborne MB acrylic dispersions. Poly(MMA-co-BA) latexes with 50% of solids content and target particle size of around 190 nm (189 nm and 187 nm for MB_S and MB_D, respectively) are synthetized by seeded semibatch emulsion polymerization using conventional or polymerizable surfactants (latexes labeled MB_D and MB_S).

Although the use of a surfmer can result in surfactant burial or formation of oligomers in the aqueous phase with consequent emulsion destabilization, SIP is successfully incorporated in the final latex obtaining particle sizes close to the target one. Moreover, this is an indirect proof that the number of polymer particles remains constant along the polymerization; namely, that neither secondary nucleation nor coagulation phenomena occurs during the reaction. In addition, the use of polymerizable surfactant (SIP) has no remarkable effects on the polymerization kinetics.

2.2 Coating Properties and Anticorrosion Performances

In order to evaluate the anticorrosion performance, MB_D and MB_S latexes are applied, at 23° C. and 60% of relative humidity (RH), on steel substrates, previously cleaned. When MB_D is cast, brown inhomogeneous stains, typical of the flash rust, appear on the steel surface. Indeed, sulfonate groups (belonging to the anionic surfactant Dowfax), in presence of water, can interact with the metal substrate forming iron complexes typically called green rust. On the other hand, when MB_S binder is used, a homogeneous yellowish stain appears on the surface of the steel, presumably due to the interaction between the phosphate groups of the latex and the steel surface. The probable explanation behind this effect is the strong interfacial acid-base interactions of $PO^{m-}$ groups with the $Fe^{n+}$. In fact, at neutral pH conditions, orthophosphate ions ($RHPO_4^-$ and $RPO_4^{2-}$) may interact with the hydroxyl groups present on the metal surface forming a dense and thin iron phosphate passivating layer (see FIG. 12).

Figure 12:
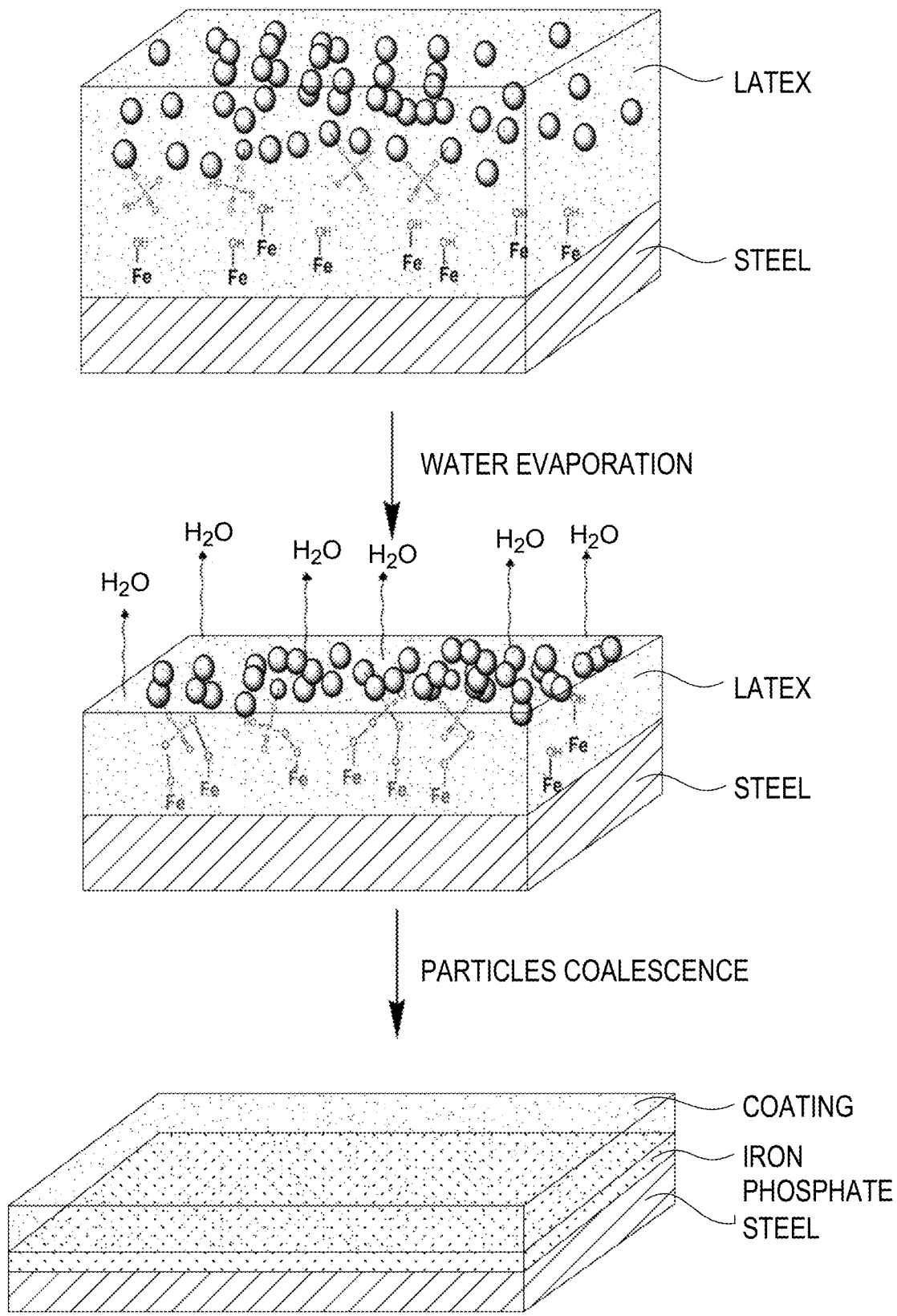
FIG. 12 provides a schematic drawing of the in-situ phosphatization mechanism during latex film formation according to the present invention.

FIG. 12 shows a schematic drawing of the in-situ phosphatization mechanism during latex film formation according to the present invention. However, it has to be pointed out that this phenomenon is controlled by the drying conditions. Depending on the drying conditions, different coatings are obtained when the latex is cast on steel substrates at different drying conditions, namely maintaining constant the drying temperature at 23° C. and changing the relative humidity (RH %) from 30% to 60%.

MB_S is cast on steel substrates at different drying conditions; T=23° C. (constant), a) RH=30%, b) RH=43%, c) RH=50%, d) RH=60%.

According to the film formation mechanism, during the water evaporation, latex particles pack, deform and eventually coalesce. Depending on the latex composition (e.g. monomers and surfactants), substrate, temperature of drying and the rate at which water evaporation occurs, different qualities of films can be obtained. The drying temperature is maintained at a constant value of 23° C., low enough to avoid the formation of superficial defects, related to a drastic evaporation of the water, and to avoid the skin layer formation due to the faster evaporation of water compared to particles diffusion. The drying rate is changed by means of variations of relative humidity (RH). In-situ phosphatization with a good film formation is favored by decreasing drying rate (best layers obtained at 60% RH). At higher drying rates (RH<60%) phosphatization does not have enough time to occur. Moreover, if the RH is reduced to 30%, the film formation is affected, as confirmed by the presence of fractures on the film surface. This observation may be indicative that above 60% RH (i.e. good film formation) a deformation by wet or capillary sintering occurs, which is avoided when water evaporation is too fast (30% RH).

Figure 13:
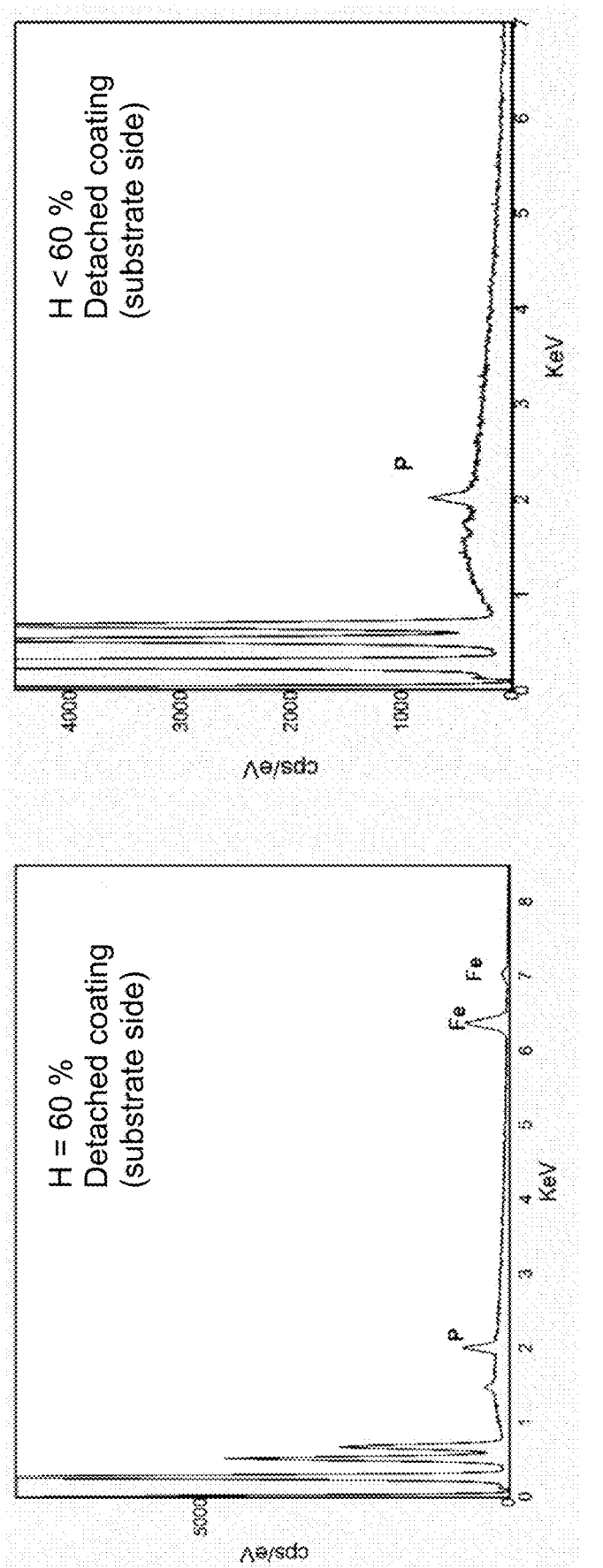
FIG. 13 provides EDX spectra of MB_S coat detached from on steel substrate after casting the latex at low drying rate (FIG. 13A, RH=60%) and at high drying rate (FIG. 13B, RH<60%).

To investigate the composition of the coating formed when drying at different rates, SEM-EDX analyses of the coating (at coating/steel interface) are performed. FIG. 13 shows that, when the latex is dried at low rates (RH=60%, FIG. 13A) in the detached coating, the characteristic peaks of iron, centered at 6.2 and 7.0 KeV, are clearly visible. This suggests that the superficial iron is covalently bonded to the coating and when the coating is detached from the steel surface, the iron phosphates stay attached to the polymeric coating. For the latex cast at higher drying rates (RH=43%) (FIG. 13B), no peaks of iron are detected at the coating interface, confirming that drying conditions have an important role in the generation of the iron phosphate layer. According to these results, it is evident that lower drying rates allow the formation of more homogeneous films and promote the strong interaction of the phosphate groups of the surfactant with the substrate.

FIG. 13 shows EDX spectra of MB_S coat detached from on steel substrate after casting the latex at low drying rate (FIG. 13A, RH=60%) and at high drying rate (FIG. 13B, RH<60%). Electrochemical impedance spectroscopy (EIS) is used to evaluate the corrosion protection of the synthetized latexes on the coated steel; the effect of phosphatization (mediated by interaction between polymer particles and steel surface), coating thickness and drying conditions are investigated. The below Table summarizes the impedance modulus values ($|Z|$ at $10^{-2}$ Hz, collected after 500 h of immersion in 3.5 wt. % NaCl solution), where MB_D and MB_S are dried at different conditions. MB_S2 and MB_S3 are films dried at the same drying conditions but with different thickness. Bare steel (labeled Steel) is used as reference. It is worth to point out that values of impedance modulus of $10^9$ $\Omega cm^2$ or higher represent the maximum values achievable by the instrument.

TABLE

Properties and anticorrosion performances of MB series coatings

| Latex | Specimen tag | Average thickness (μm) | Drying conditions T (° C.) | RH (%) | Ph* | Flash rust | $|Z|$ ($\Omega$ cm$^2$) ** |
|---|---|---|---|---|---|---|---|
| MB_S | MB_S1 | 30 | 23 | 60 | yes | no | $10^9$-$10^{10}$ |
|  | MB_S2 | 30 | 23 | <60 | no | no | $10^9$-$10^{10}$ |
|  | MB_S3 | 90 | 23 | <60 | no | no | $10^9$-$10^{10}$ |
| MB_D | MB_D1 | 30 | 23 | 60 | no | yes | $10^9$-$10^{10}$ |
| None | Steel | — | — | — | — | — | $10^3$ |

Figure 14:
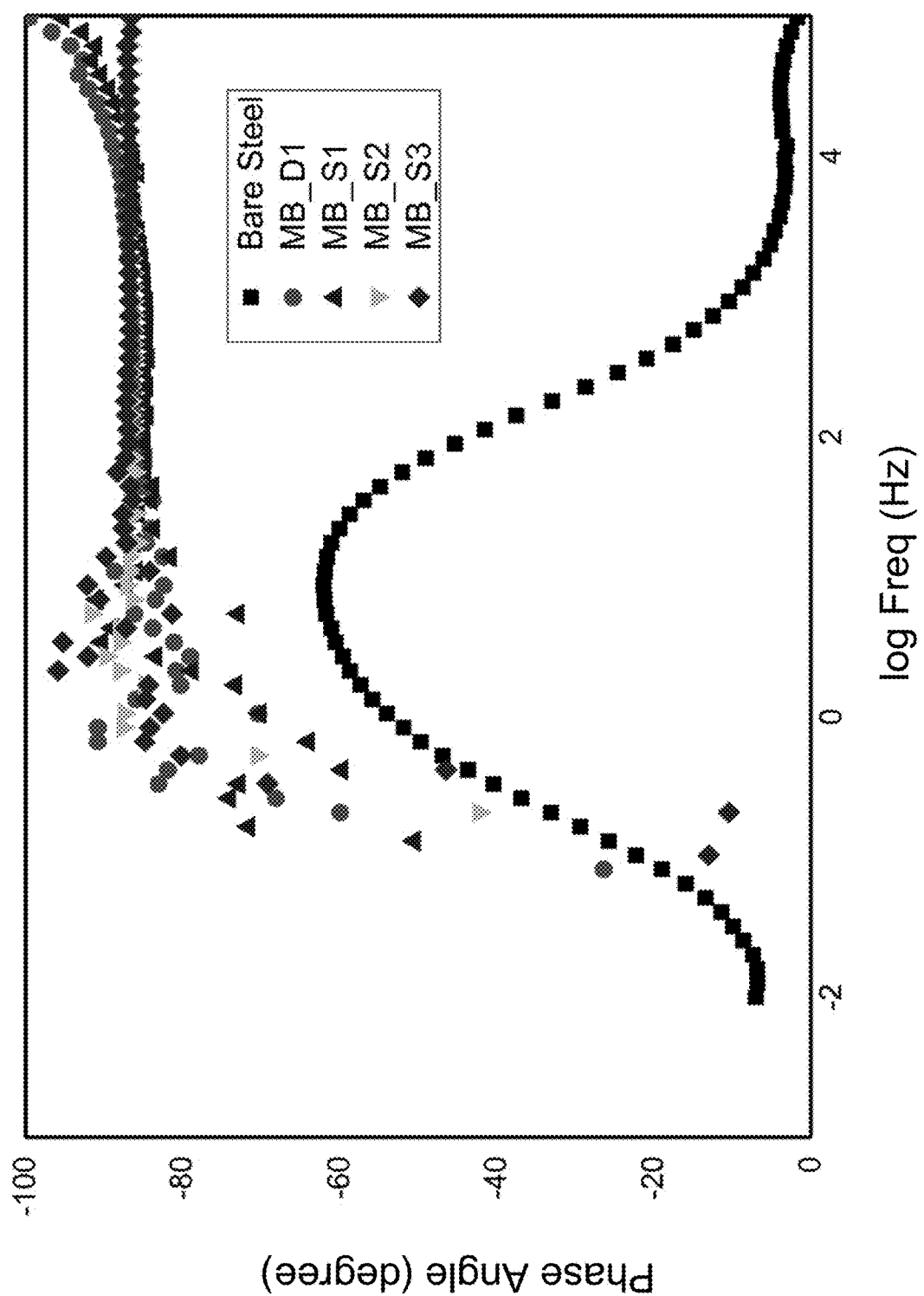
FIG. 14 provides additional properties and anticorrosion performances of the MB series coatings.

*Phosphatization
** Values collected at $10^{-2}$ Hz after 500 hours of immersion in 3.5 wt. % NaCl solution At first glance, all the coatings show great corrosion protection due to the capacitive behavior, with impedance modulus values higher than $10^9$ $\Omega cm^2$ compared to that of bare steel at $10^3$ $\Omega cm^2$. Coated systems show a single time constant whilst bare steel shows two time constants; although the second one is not well defined at low frequencies (see FIG. 14). Usually, the medium-low frequency window (from 1 to $10^{-3}$ Hz) provides information of the coating/metal interface (e.g. charge transfer resistance and double layer capacitance related to the corrosion process, oxide resistance and capacitance related to passivation of the interface, etc.), while the high frequency range (from $10^5$ to 1 Hz) provides information of the barrier response of the coating. Considering the low frequency range, the impedance modulus is similar for all coatings and substantially higher than the reference substrate (more than 6 order of magnitude higher than bare steel). Neither the coating cast at lower relative humidity (without phosphatization layer MB_S2) nor the coating with higher thickness (MB_S3) present any noticeable difference in the whole frequency range of Bode plot; namely, at the mild conditions of exposure (500 h in a solution of 3 wt. % of NaCl) the performance of the coatings is very similar. The coating made out of the conventional surfactant did also present the same performance. This is indicative of the performance of the good barrier performance of the copolymer system employed in all coatings under the mild exposure conditions.

In order to get information about the effect of the phosphatization layer, experiments using a harsh environment are carried out (e.g. accelerated salt spray tests). The results for steel specimens coated with these latexes are summarized in the below Table.

TABLE

| | | | Salt spray test performances for MB_S and MB_D | | | |
|---|---|---|---|---|---|---|
| | Specimen | Film thickness | Drying conditions | | IZI ($\Omega$ cm$^2$)* | |
| Latex | tag | ($\mu$m) | T (° C.) | RH (%) | 144 h | 408 h |
| MB_S | MB_S4 | 58 | 23 | 60 | $10^9$-$10^{10}$ | $10^9$-$10^{10}$ |
| MB_D | MB_D2 | 60 | 23 | 60 | $10^9$-$10^{10}$ | $10^8$ |

*Impedance modulus values at $10^{-2}$ Hz after 144 and 408 hours in salt spray test The impedance is measured after different exposure periods in the NSS chamber. Although the barrier protection remains intact after 144 h of exposure for both coatings, the influence of substrate phosphatization shows up after 408 h. In fact, the impedance modulus of MB_D2 (at low frequency range) drops to $\approx 10^8$ $\Omega$cm$^2$ while MB_S4 maintains the high value of $\approx 10^{10}$ $\Omega$cm$^2$.

NSS results confirm the enhanced corrosion protection of MB_S coating by a synergetic effect of good barrier properties together with the substrate phosphatization. In fact, the permeation of water and ions through MB_D2 starts to be more effective and, due to the absence of a passive layer at the coating/substrate interface, the corrosion mechanism occurred for this sample.

3. Conclusions

Poly(MMA-co-BA) nanoparticle dispersions with phosphated functionalities (MB_S) are successfully synthetized by seeded semibatch emulsion polymerization by using a polymerizable phosphate surfactant (SIP).

When MB_S latex is applied on low carbon steel, it is found that the phosphated functionalities, bearing from SIP, are able to phosphatize the steel surface under slow drying rates (e.g. T=23° C. and RH=60%); by energy dispersed X-rays analysis (EDX) the formation of a passive thin iron phosphate layer at the metal-coating surface is confirmed.

Coatings made from these latexes yield a thin phosphatization layer on steel substrates when dried at relative humidity higher than 60% at room temperature. This layer plays a very important role on the anticorrosion properties of these coatings. It is found that in harsh exposure conditions the coatings containing the in-situ produced phosphatization layer are able to present excellent corrosion after 400 h in salt-spray chamber, whereas comparative latexes (i.e. non-inventive) produced with the same composition but using a conventional non-polymerizable and non-phosphate containing group fail and corrosion starts on the steel substrates. This opens the possibility to use this functional waterborne dispersion of the present invention in paint formulations.

The invention claimed is:

1. A method for providing corrosion-protective properties to a metal surface,
wherein the method comprises a step of applying a coating system to a metal surface to be provided with corrosion protection;
wherein the coating system comprises a copolymer comprising moieties (i), (ii) and (iii) according to the following definition and each being different from one another:
(i) a moiety derived from a first ethylenically unsaturated monomer, the homopolymer of which has a glass transition temperature $Tg^{(i)}$ ranging from 30° C. to 200° C.,
(ii) a moiety derived from a second ethylenically unsaturated monomer, the homopolymer of which has a glass transition temperature $Tg^{(ii)}$ ranging from $-100°$ C. to $-10°$ C., and
(iii) a moiety derived from a phosphate-group containing methacrylic monomer (PAM), wherein the phosphate-group containing methacrylic monomer (PAM) is selected from phosphates and phosphate esters of polyalkylene glycol monomethacrylates and corresponds to the following general formula (III):

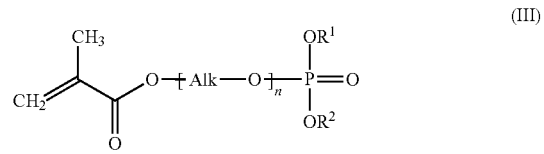

in which formula (III)
$R^1$ and $R^2$, independently from each other, represent hydrogen or alkyl,
represents a propylene radical;
"n" is a positive integer in the range of from 2 to 200;
wherein (iii) the phosphate-group containing methacrylic monomer (PAM), which is selected from phosphates and phosphate esters of polyalkylene glycol monomethacrylates, is a mixture of monoalkylphosphate esters of polypropylene glycol monomethacrylate and dialkylphosphate esters of polypropylene glycol monomethacrylate according to formula (III).

2. The method according to claim 1,
wherein the step of applying the coating system to the metal surface is followed by a drying step such that a polymeric film results which adheres to the metal surface to be protected.

3. The method according to claim 2,
wherein the polymeric film comprises a film thickness, based on the dry film, in the range of from 5 to 500 micrometers.

4. The method according to claim 2,
wherein the drying step is performed under controlled conditions such that phosphatization of the metal surface is effected.

5. The method according to claim 2,
wherein the drying step is performed under controlled conditions selected among controlled temperatures and a controlled humidity.

6. The method according to claim 2,
wherein the drying step is performed at temperatures in the range of from 20 to 80° C. and at a relative humidity in the range of from 30% to 80%.

7. The method according to claim 2,
wherein the drying step is performed at temperatures in the range of from 20 to 30° C. and at a relative humidity in the range of from 50% to 70%.

8. The method according to claim 1
wherein the coating system is applied in the form of a waterborne composition.

9. The method according to claim 1
wherein the copolymer comprises moieties (i), (ii) and (iii) with a (i)/(ii)/(iii)-weight ratio of (40-60)/(40-60)/(1-5), however, with the proviso that the sum of the weight shares results in 100.

10. The method according to claim 1
wherein (i) the first ethylenically unsaturated monomer, the homopolymer of which has a glass transition temperature $Tg^{(i)}$ ranging from 30° C. to 200° C., is methyl methacrylate (MMA).

11. The method according to claim 1
wherein (ii) the second ethylenically unsaturated monomer, the homopolymer of which has a glass transition temperature $Tg^{(ii)}$ ranging from −100° C. to −10° C., is butyl acrylate (BA).

12. The method according to claim 1
wherein (iii) the phosphate-group containing methacrylic monomer (PAM), which is selected from phosphates and phosphate esters of polyalkylene glycol monomethacrylates, is characterized by a weight average molecular weight Mw in the range of from 250 to 3,000 g/mol; and
wherein (iii) the phosphate-group containing methacrylic monomer (PAM), which is selected from phosphates and phosphate esters of polyalkylene glycol monomethacrylates, is characterized by a viscosity at 23° C. of ≤4,700 cP and by a total acid number in the range of from 50 to 200 mg KOH/g.

13. The method according to claim 1
wherein the copolymer further comprises:
(iv) an additional moiety derived from a monomer selected from perfluoroalkyl (meth)acrylates (PFA) and stearyl(meth)acrylates (SMA).

14. The method according to claim 1
wherein the coating system is characterized by at least one of the following features (a) to (f):
(a) the coating system additionally comprises at least one surfactant,
(b) the coating system additionally comprises at least one buffer,
(c) the coating system has a neutral to slightly alkaline pH value,
(d) the coating system has a solid content, based on the total weight of the coating system, of at least 25% by weight,
(e) the coating system has a solid content, based on the total weight of the coating system, in the range of from 25 to 80% by weight,
(f) the coating system comprises the copolymer with absolute particle sizes in the range of from 50 nm to 5 micrometers.

15. The method according to claim 13,
wherein the coating system comprises at least one of the following copolymers:
copolymers comprising moieties (i), (ii) and (iii) with a (i)/(ii)/(iii)-weight ratio of (10-90)/(10-90)/(0.1-20), however, with the proviso that the sum of the weight shares results in 100;
copolymers comprising moieties (i), (ii), (iii) and (iv) with a (i)/(ii)/(iii)/(iv)-weight ratio of (20-60)/(10-50)/(0.1-20)/(10-50), however, with the proviso that the sum of the weight shares results in 100;
copolymers comprising moieties (i), (ii), (iii) and (iv) with a (i)/(ii)/(iii)/(iv)-weight ratio of (10-60)/(10-60)/(0.1-20)/(20-70), however, with the proviso that the sum of the weight shares results in 100.

16. The method according to claim 1
wherein the coating system is free of any organic solvents and of any volatile organic compounds (VOCs).

17. The method according to claim 1
wherein the coating system is comprised in paints, lacquers, varnishes, colors, impregnations, glazes, enamels or finishes.

18. The method according to claim 1
wherein the metal surface is selected from metal surfaces of iron and iron-containing alloys, steel surfaces, metal surfaces of aluminum and aluminum-containing alloys and metal surfaces of magnesium and magnesium-containing alloys and combinations thereof.

* * * * *